US012176971B2

(12) United States Patent
Kim

(10) Patent No.: US 12,176,971 B2
(45) Date of Patent: Dec. 24, 2024

(54) METHOD AND COMMUNICATION APPARATUS FOR TRANSMITTING AND RECEIVING CHANNEL STATE INFORMATION FOR A RADIO CHANNEL BETWEEN A TELEMATICS COMMUNICATION UNIT AND A BASE STATION

(71) Applicant: LG ELECTRONICS INC., Seoul (KR)

(72) Inventor: Cheolseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 360 days.

(21) Appl. No.: 17/753,327

(22) PCT Filed: Sep. 5, 2019

(86) PCT No.: PCT/KR2019/011463
§ 371 (c)(1),
(2) Date: Feb. 28, 2022

(87) PCT Pub. No.: WO2021/045266
PCT Pub. Date: Mar. 11, 2021

(65) Prior Publication Data
US 2022/0329292 A1 Oct. 13, 2022

(51) Int. Cl.
*H04B 7/0408* (2017.01)
*H04B 7/06* (2006.01)
*H04B 7/26* (2006.01)

(52) U.S. Cl.
CPC ......... *H04B 7/0408* (2013.01); *H04B 7/0695* (2013.01); *H04B 7/264* (2013.01)

(58) Field of Classification Search
CPC ............. H04B 7/0695; H04B 7/06952; H04B 7/0617; H04B 7/0626; H04B 7/088;
(Continued)

(56) References Cited

U.S. PATENT DOCUMENTS

2013/0057432 A1* 3/2013 Rajagopal ............ H01Q 25/002
342/368
2015/0349977 A1 12/2015 Risse et al.
(Continued)

FOREIGN PATENT DOCUMENTS

KR 2019-0100107 8/2019

OTHER PUBLICATIONS

PCT International Application No. PCT/KR2020/011463, International Search Report dated Jun. 3, 2020, 4 pages.
(Continued)

*Primary Examiner* — Peter Chen
(74) *Attorney, Agent, or Firm* — LEE, HONG, DEGERMAN, KANG & WAIMEY

(57) ABSTRACT

A disclosure of the present specification provides a server for controlling a TCU mounted in a vehicle. The server comprises: a transceiver; and a processor for controlling the transceiver wherein the processor may perform the steps of: receiving channel state information regarding a wireless channel between the TCU and the base station; determining an available data rate for a combination of a plurality of transmission beams of the base station and a plurality of reception beams of the TCU; receiving a data request message of the TCU; determining a first transmission beam to be used for transmission of first data; and transmitting the first data and information regarding the first transmission beam.

11 Claims, 18 Drawing Sheets

(58) Field of Classification Search
CPC .... H04B 7/0408; H04B 7/264; H04B 1/3822; H04L 67/12; H04L 5/0048; H04W 16/28; H04W 4/40; H04W 4/44; H04W 72/046
See application file for complete search history.

(56) References Cited

U.S. PATENT DOCUMENTS

| | | |
|---|---|---|
| 2016/0203652 A1 | 7/2016 | Throop et al. |
| 2017/0032402 A1 | 2/2017 | Patsiokas et al. |
| 2021/0099260 A1* | 4/2021 | Guan ................ H04L 1/08 |

OTHER PUBLICATIONS

Continental Automotive GMBH, "Practical Considerations on Telematic Control Units and Intelligent Antenna Modules," R4-1813119, 3GPP TSG RAN WG4 Meeting #88bis, Oct. 2018, 7 pages.

* cited by examiner

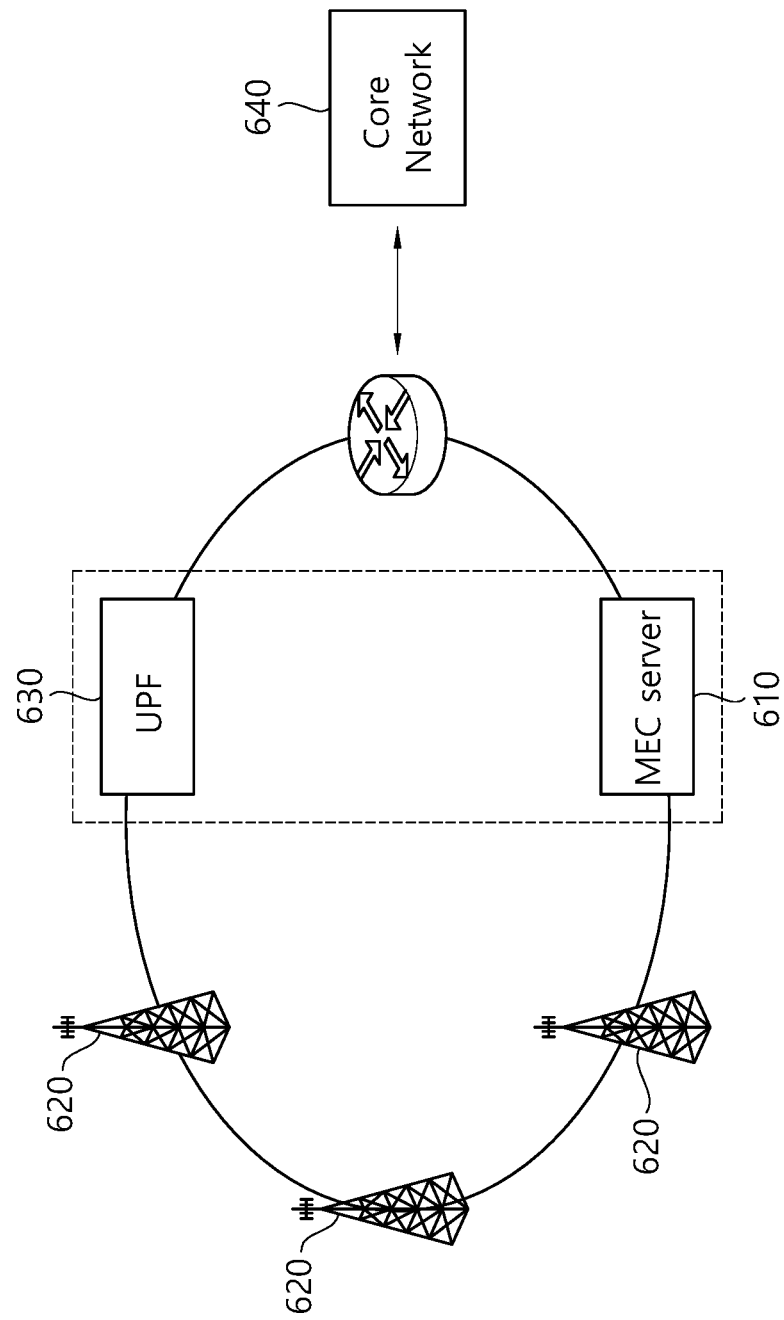

METHOD AND COMMUNICATION APPARATUS FOR TRANSMITTING AND RECEIVING CHANNEL STATE INFORMATION FOR A RADIO CHANNEL BETWEEN A TELEMATICS COMMUNICATION UNIT AND A BASE STATION

CROSS-REFERENCE TO RELATED APPLICATIONS

This application is the National Stage filing under 35 U.S.C. 371 of International Application No. PCT/KR2019/011463, filed on Sep. 5, 2019, the contents of which is hereby incorporated by reference herein in its entirety.

TECHNICAL FIELD

The present disclosure generally relates to mobile communication.

BACKGROUND

Thanks to the success of Evolved Universal Terrestrial Radio Access Network (E-UTRAN), that is, long term evolution (LTE)/LTE-Advanced (LTE-A) for 4G mobile communication, interest in next-generation, that is, 5G (so-called 5G) mobile communication is increasing, and research is being conducted one after another.

For the fifth generation (so-called 5G) mobile communication, a new radio access technology (New RAT or NR) has been studied. In particular, automotive driving is expected to become an important new driving force for 5G with various use cases of mobile communication for vehicles.

In the case of autonomous driving, where the server remotely controls the vehicle, it should take less than 5 msec, until the vehicle transmits data to the server, the vehicle receives control data from this server and the vehicle operates.

However, in the conventional cloud server-based network structure (eg, base station-wired network-cloud server), there is a problem that it takes about 30-40 msec for operations that the base station transmits the data received from the vehicle to the cloud server, the cloud server analyzes the data in the cloud server, the cloud server transmits the data to the base station, and the base station receives the data.

In order to improve the conventional network structure and achieve URLLC, ETSI (European Telecommunications Standards Institute) and 5GAA are discussing about Multi-access Edge Computing (MEC). However, there has not been a method in which data transmission/reception between the MEC server and the TCU mounted on the vehicle can be performed quickly and efficiently.

For example, when a user riding in a vehicle equipped with a TCU uses a multimedia service such as VR, AR, 4K video, or 8K video, the data rate required by the multimedia service may be 25 to 30 Gbps or more. At this time, even if the TCU receives data using the antenna of the mmWave 5G module, a data rate of 20 Gbps or more may not be satisfied.

As another example, the Ethernet communication speed of the TCU may vary according to the hardware implementation of the TCU, such as 100 Mbps, 1 Gbps, 10 Gbps. A user in a vehicle may want to use a multimedia service that is higher than the Ethernet communication speed of the TCU. Then, the TCU requests data related to the multimedia service from the MEC server even though the Ethernet communication speed of the TCU is less than the data rate required for the multimedia service. Accordingly, in the prior art, the MEC server receives data from the cloud server related to the multimedia service and transmits the received data to the TCU without considering the Ethernet communication speed of the TCU. Then, the TCU could not properly provide the multimedia service to the user by receiving data having a data rate higher than the Ethernet communication speed of the TCU.

As another example, the MEC server did not consider the type of data when determining a transmission beam used when transmitting data to the TCU. For example, control data such as brake ECU control data or engine ECU control data related to safety needs to be transmitted to the TCU quickly. However, conventionally, the MEC server does not guarantee vehicle safety by allocating a transmission beam without considering the type of data.

SUMMARY

Accordingly, a disclosure of the present specification has been made in an effort to solve the aforementioned problem.

In order to achieve the above object, one disclosure of the present specification provides a server for controlling a Telematics Communication Unit (TCU) mounted on a vehicle in a next-generation mobile communication system. The server includes a transceiver; and a processor for controlling the transceiver, wherein the processor is configured to perform operations including: controlling the transceiver to receive channel state information on a radio channel between the TCU and the base station from a mobile communication network including the base station; determining a data rate available for a combination of a plurality of transmit beams of the base station and a plurality of receive beams of the TCU based on the channel state information; controlling the transceiver to receive a data request message of the TCU from the mobile communication network, wherein the data request message including information related to first data requested by the TCU; determining a first transmission beam to be used for transmission of the first data based on the data request message of the TCU and the determined available data rate; and controlling the transceiver to transmit the first data and information on the first transmission beam to the mobile communication network.

The data request message may further include information on the Ethernet communication speed of the TCU.

The information related to the first data may include information on a type of the first data and information on a minimum data rate of the first data.

When the type of the first data is control data used to control the operation of the vehicle, the first transmission beam may be determined as a transmission beam corresponding to data rate having the largest value among the determined available data rates among a plurality of transmission beams of the base station.

When the first data includes a plurality of control data, a first transmission beam for each of the plurality of control data is determined as a transmission beam corresponding to a data rate of a larger value in the order of priority of the plurality of control data.

When the type of the first data is normal data, the first transmission beam may be determined based on information on the Ethernet communication speed of the TCU, information on the minimum data rate of the first data, and the determined available data rate.

The processor further performs a process of receiving information on a TCU connected to the base station from the mobile communication system, and the information on the TCU includes at least one of an ID of the TCU, a service list of the TCU, and a delay requirement of the TCU or the minimum data rate requirements of the TCU.

The information on the first transmission beam may be used to transmit the first data to the TCU using the first transmission beam of the base station.

In order to achieve the above object, one disclosure of the present specification provides a TCU (Telematics Communication Unit) mounted on a vehicle. The TCU includes a transceiver; Memory; and a processor for controlling the transceiver and the memory, wherein the processor is configured to perform operations including: controlling the transceiver to transmit channel state information on a radio channel between a base station and the TCU to the base station; controlling the transceiver to transmit a data request message to the base station, the data request message including information related to first data requested by at least one device mounted on the vehicle; and controlling the transceiver to receive the first data from the base station through the first transmit beam of the base station.

The data request message may further include information on the Ethernet communication speed of the TCU.

The information related to the first data may include information on a type of the first data and information on a minimum data rate of the first data.

The processor may further perform a process of receiving information related to the first data from the at least one device.

The processor may further perform a process of transmitting the received first data to the at least one device.

According to the disclosure of the present specification, the existing problems are solved.

BRIEF DESCRIPTION OF THE DRAWINGS

FIGS. 6a to 6d show an example implementation of the MEC server.

DESCRIPTION OF EXEMPLARY EMBODIMENTS

Figure 1:
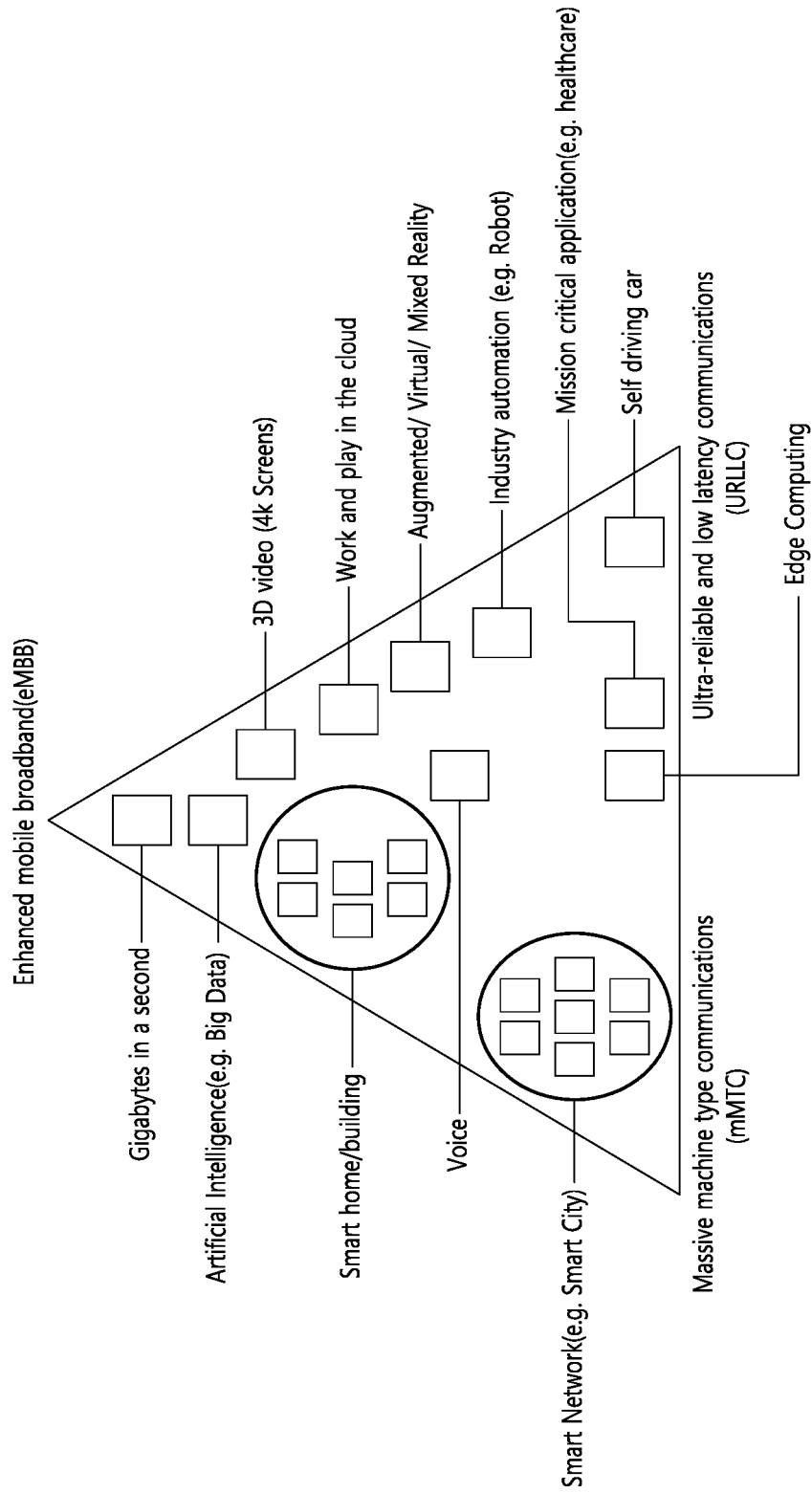
FIG. 1 shows an example of a 5G usage scenario.

Hereinafter, it is described that the present disclosure is applied based on 3rd Generation Partnership Project (3GPP) 3GPP long term evolution (LTE), 3GPP LTE-A (LTE-Advanced), Wi-Fi or 3GPP NR (New RAT, that is, 5G) do. This is merely an example, and the present disclosure can be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

And, hereinafter, the term UE (User Equipment) used may be fixed or mobile, and may include a device, a wireless device, a wireless communication device, a terminal, and an MS (mobile station), UT (user terminal), SS (subscriber station), MT (mobile terminal), etc may be called as other terms.

FIG. 1 Shows an Example of a 5G Usage Scenario.

FIG. 1 shows an example of a 5G usage scenario to which the technical features of the present disclosure can be applied. The 5G usage scenario shown in FIG. 1 is merely exemplary, and the technical features of the present disclosure can be applied to other 5G usage scenarios not shown in FIG. 1.

Referring to FIG. 1, the three main requirements areas of 5G are (1) enhanced mobile broadband (eMBB) domain, (2) massive machine type communication (mMTC) area domain and (3) includes ultra-reliable and low latency communications (URLLC) domains. Some use cases may require multiple domains for optimization, while other use cases may focus on only one key performance indicator (KPI). 5G supports these various use cases in a flexible and reliable way.

eMBB focuses on overall improvements in data rates, latency, user density, capacity and coverage of mobile broadband connections. eMBB aims for a throughput of around 10 Gbps. eMBB goes far beyond basic mobile Internet access, covering rich interactive work, media and entertainment applications in the cloud or augmented reality. Data is one of the key drivers of 5G, and for the first time in the 5G era, we may not see dedicated voice services. In 5G, voice is simply expected to be processed as an application using the data connection provided by the communication system. The main reasons for the increased amount of traffic are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to users. Cloud storage and applications are growing rapidly in mobile communication platforms, which can be applied to both work and entertainment. Cloud storage is a special use case that drives the growth of uplink data rates. 5G is also used for remote work in the cloud, requiring much lower end-to-end latency to maintain a good user experience when tactile interfaces are used. In entertainment, for example, cloud gaming and video streaming are another key factor increasing the demand for mobile broadband capabilities. Entertainment is essential on smartphones and tablets anywhere, including in high-mobility environments such as trains, cars and airplanes. Another use example is augmented reality for entertainment and information retrieval. Here, augmented reality requires very low latency and instantaneous amount of data.

mMTC is designed to enable communication between a large number of low-cost devices powered by batteries and is intended to support applications such as smart metering, logistics, field and body sensors. mMTC is targeting a battery life of 10 years or so and/or a million devices per square kilometer. mMTC enables seamless connectivity of embedded sensors in all fields and is one of the most anticipated 5G use cases. Potentially, by 2020, there will be 20.4 billion IoT devices. Industrial IoT is one of the areas where 5G will play a major role in enabling smart cities, asset tracking, smart utilities, agriculture and security infrastructure.

URLLC is ideal for vehicular communications, industrial control, factory automation, telesurgery, smart grid, and public safety applications by allowing devices and machines to communicate very reliably, with very low latency and with high availability. URLLC aims for a delay on the order of 1 ms. URLLC includes new services that will transform the industry through ultra-reliable/low-latency links such as remote control of critical infrastructure and autonomous vehicles. This level of reliability and latency is essential for smart grid control, industrial automation, robotics, and drone control and coordination.

Next, a plurality of usage examples included in the triangle of FIG. 1 will be described in more detail.

5G could complement fiber-to-the-home (FTTH) and cable-based broadband (or DOCSIS) as a means of delivering streams rated at hundreds of megabits per second to gigabits per second. Such high speed may be required to deliver TVs with resolutions of 4K or higher (6K, 8K and higher) as well as virtual reality (VR) and augmented reality (AR). VR and AR applications almost include immersive sports events. Certain applications may require special network settings. For VR games, for example, game companies may need to integrate core servers with network operators' edge network servers to minimize latency.

Smart cities and smart homes, referred to as smart societies, will be embedded with high-density wireless sensor networks. A distributed network of intelligent sensors will identify conditions for keeping a city or house cost- and energy-efficient. A similar setup can be performed for each household. Temperature sensors, window and heating controllers, burglar alarms and appliances are all connected wirelessly. Many of these sensors typically require low data rates, low power and low cost. However, for example, real-time HD video may be required in certain types of devices for surveillance.

The consumption and distribution of energy, including heat or gas, is highly decentralized, requiring automated control of distributed sensor networks. Smart grids use digital information and communication technologies to interconnect these sensors to collect information and act on it. This information can include supplier and consumer behavior, enabling smart grids to improve efficiency, reliability, economics, sustainability of production and distribution of fuels such as electricity in an automated manner. The smart grid can also be viewed as another low-latency sensor network.

The health sector has many applications that can benefit from mobile communications. The communication system may support telemedicine providing clinical care from a remote location. This can help reduce barriers to distance and improve access to consistently unavailable health care services in remote rural areas. It is also used to save lives in critical care and emergency situations. A wireless sensor network based on mobile communication may provide remote monitoring and sensors for parameters such as heart rate and blood pressure.

Wireless and mobile communications are becoming increasingly important in industrial applications. Wiring is expensive to install and maintain. Thus, the possibility of replacing cables with reconfigurable radio links is an attractive opportunity for many industries. Achieving this, however, requires that wireless connections operate with cable-like delays, reliability and capacity, and that their management is simplified. Low latency and very low error probability are new requirements that need to be connected with 5G.

Logistics and freight tracking are important use cases for mobile communications that use location-based information systems to enable tracking of inventory and packages from anywhere. Logistics and freight tracking use cases typically require low data rates but require wide range and reliable location information.

In particular, automotive is expected to become an important new driving force for 5G with many use cases for mobile communication to vehicles. For example, entertainment for passengers requires both high capacity and high mobile broadband. The reason is that future users continue to expect high-quality connections regardless of their location and speed. Another example of use in the automotive sector is augmented reality dashboards. The augmented reality contrast board allows drivers to identify objects in the dark above what they are seeing through the front window. The augmented reality dashboard displays information to inform the driver about the distance and movement of objects by superimposing the information on the front window. In the future, wireless modules will enable communication between vehicles, information exchange between vehicles and supporting infrastructure, and information exchange between vehicles and other connected devices (eg, devices carried by pedestrians). Safety systems can lower the risk of accidents by guiding drivers through alternative courses of action to help them drive safer. The next step will be remote-controlled vehicles or autonomous vehicles. This requires very reliable and very fast communication between different autonomous vehicles and/or between vehicles and infrastructure. In the future, autonomous vehicles will perform all driving activities, allowing drivers to focus only on traffic anomalies that the vehicle itself cannot identify. The technological requirements of autonomous vehicles require ultra-low latency and ultra-fast reliability to increase traffic safety to unattainable levels for humans.

Figure 2:
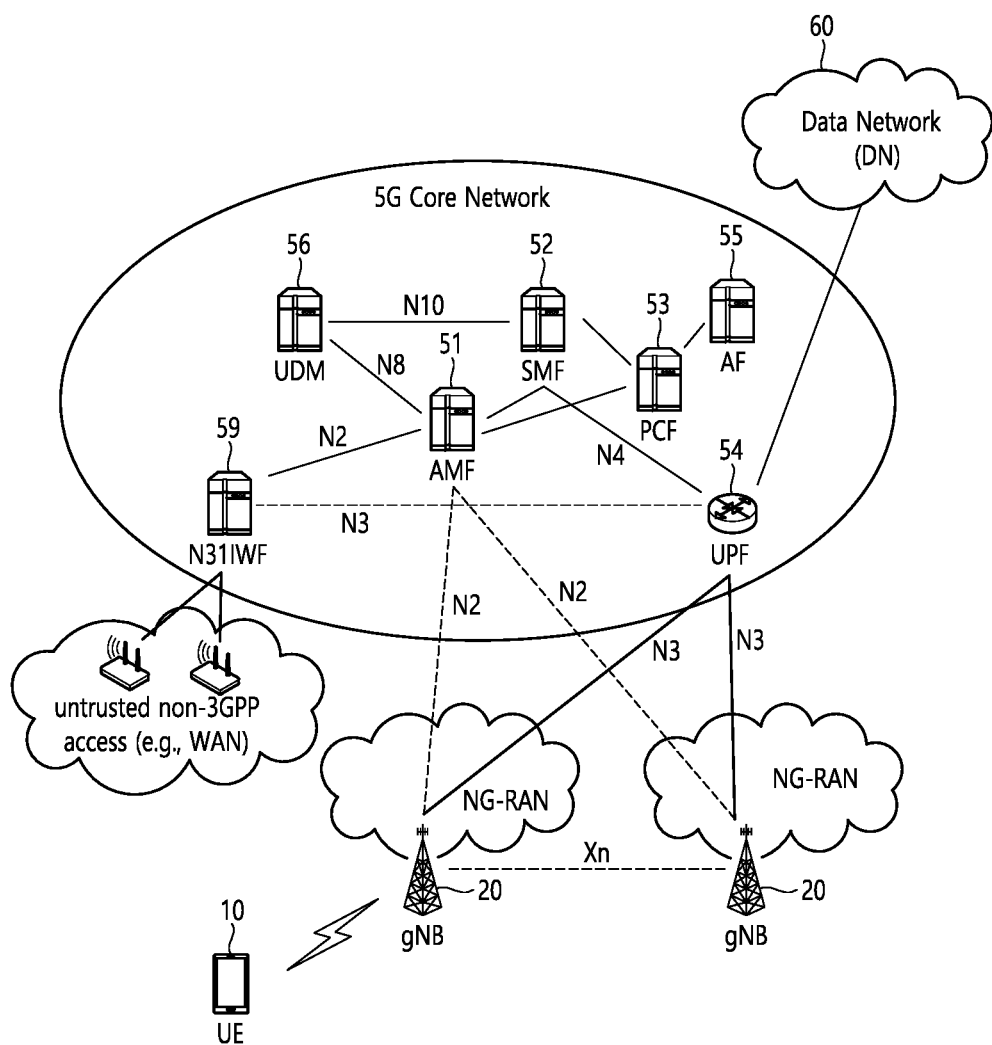
FIG. 2 is a structural diagram of a next-generation mobile communication network.

FIG. 2 is a Structural Diagram of a Next-Generation Mobile Communication Network.

A next-generation mobile communication network (5G System) may include various components, and in FIG. 2, AMF (Access and Mobility Management Function) 51 and SMF (session management function), Session Management Function (52), PCF (Policy Control Function) (53), AF (Application Function: Application Function) (55), N3IWF (Non-3GPP Interworking Function: Non-3GPP Interworking Function) 59, a UPF (User Plane Function) 54, a UDM (Unified Data Management), and data network 56 corresponding to some of the various components are shown.

The UE 10 is connected to the data network 60 via the UPF 55 through a Next Generation Radio Access Network (NG-RAN) including the gNB 20.

The UE 10 may be provided with a data service even through untrusted non-3GPP access, e.g., a wireless local area network (WLAN). In order to connect the non-3GPP access to a core network, the N3IWF 59 may be deployed.

The illustrated N3IWF performs a function of managing interworking between the non-3GPP access and the 5G system. When the UE 10 is connected to non-3GPP access (e.g., WiFi referred to as IEEE 801.11), the UE 10 may be connected to the 5G system through the N3IWF. The N3IWF performs control signaling with the AMF and is connected to the UPF through an N3 interface for data transmission.

The illustrated AMF may manage access and mobility in the 5G system. The AMF may perform a function of managing Non-Access Stratum (NAS) security. The AMF may perform a function of handling mobility in an idle state.

The illustrated UPF is a type of gateway through which user data is transmitted/received. The UPF may perform the entirety or a portion of a user plane function of a serving gateway (S-GW) and a packet data network gateway (P-GW) of 4G mobile communication.

The UPF operates as a boundary point between a next generation radio access network (NG-RAN) and the core network and maintains a data path between the gNB 20 and the SMF. In addition, when the UE 10 moves over an area served by the gNB 20, the UPF serves as a mobility anchor point. The UPF may perform a function of handling a PDU. For mobility within the NG-RAN (which is defined after 3GPP Release-15), the UPF may route packets. In addition, the UPF may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF may correspond to a termination point of a data interface toward the data network.

The illustrated PCF is a node that controls an operator's policy.

The illustrated AF is a server for providing various services to the UE 10.

The illustrated UDM is a kind of server that manages subscriber information, such as home subscriber server (HSS) of 4G mobile communication. The UDM stores and manages the subscriber information in a unified data repository (UDR).

The illustrated SMF may perform a function of allocating an Internet protocol (IP) address of the UE. In addition, the SMF may control a protocol data unit (PDU) session.

Figure 3:
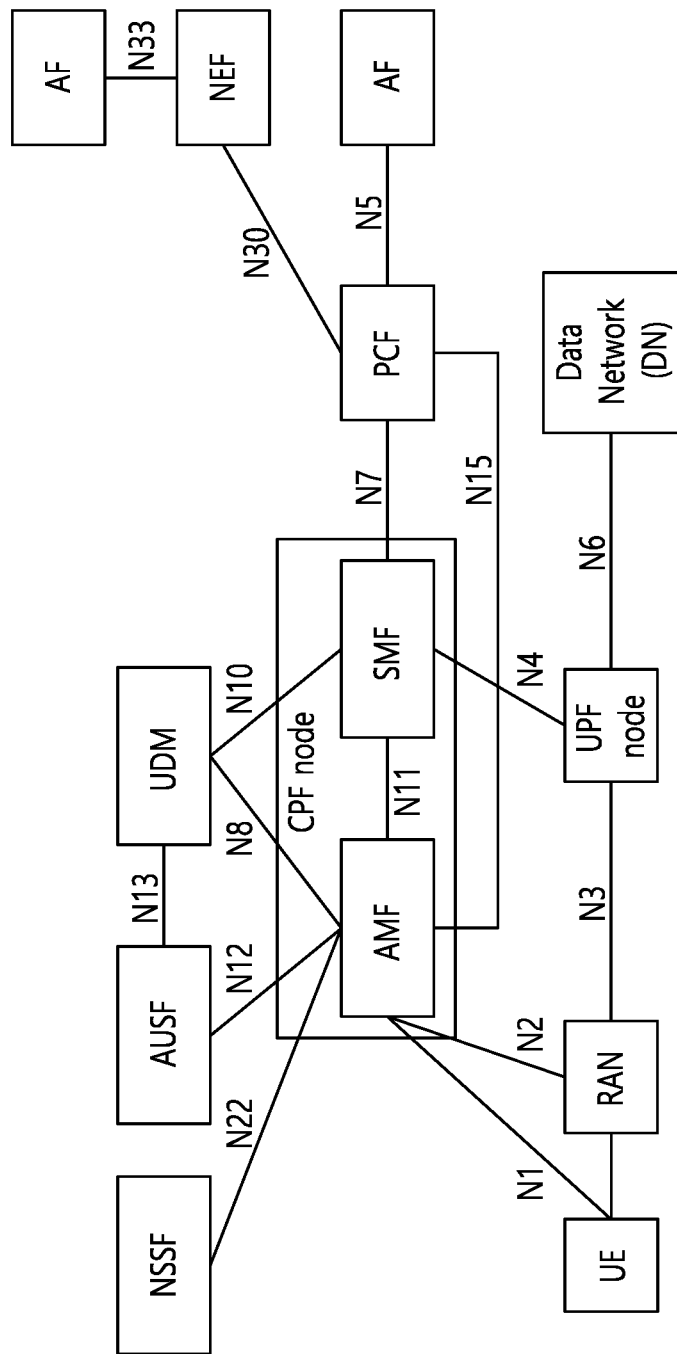
FIG. 3 is an exemplary diagram illustrating an expected structure of a next-generation mobile communication network from the viewpoint of a node.

FIG. 3 is an Exemplary Diagram Illustrating an Expected Structure of a Next-Generation Mobile Communication Network from the Viewpoint of a Node.

As can be seen with reference to FIG. 3, the UE is connected to a data network (DN) through a next-generation RAN (Radio Access Network).

The illustrated control plane function (CPF) node performs all or part of the functions of the Mobility Management Entity (MME) of the 4th generation mobile communication, and all or part of the control plane functions of the Serving Gateway (S-GW) and all or part of the control plane functions of the PDN Gateway (P-GW). The CPF node includes an AMF and an SMF.

The illustrated Authentication Server Function (AUSF) authenticates and manages the UE.

The illustrated network slice selection function (Network Slice Selection Function: NSSF) is a node for network slicing introduced in 5G.

The illustrated Network Exposure Function (NEF) is a node for providing a mechanism for securely exposing the services and functions of the 5G core. For example, NEF may expose functions and events, securely provide information from external applications to the 3GPP network, translate internal/external information, provides control plane parameters, and manage packet flow description (PFD).

Figure 4:
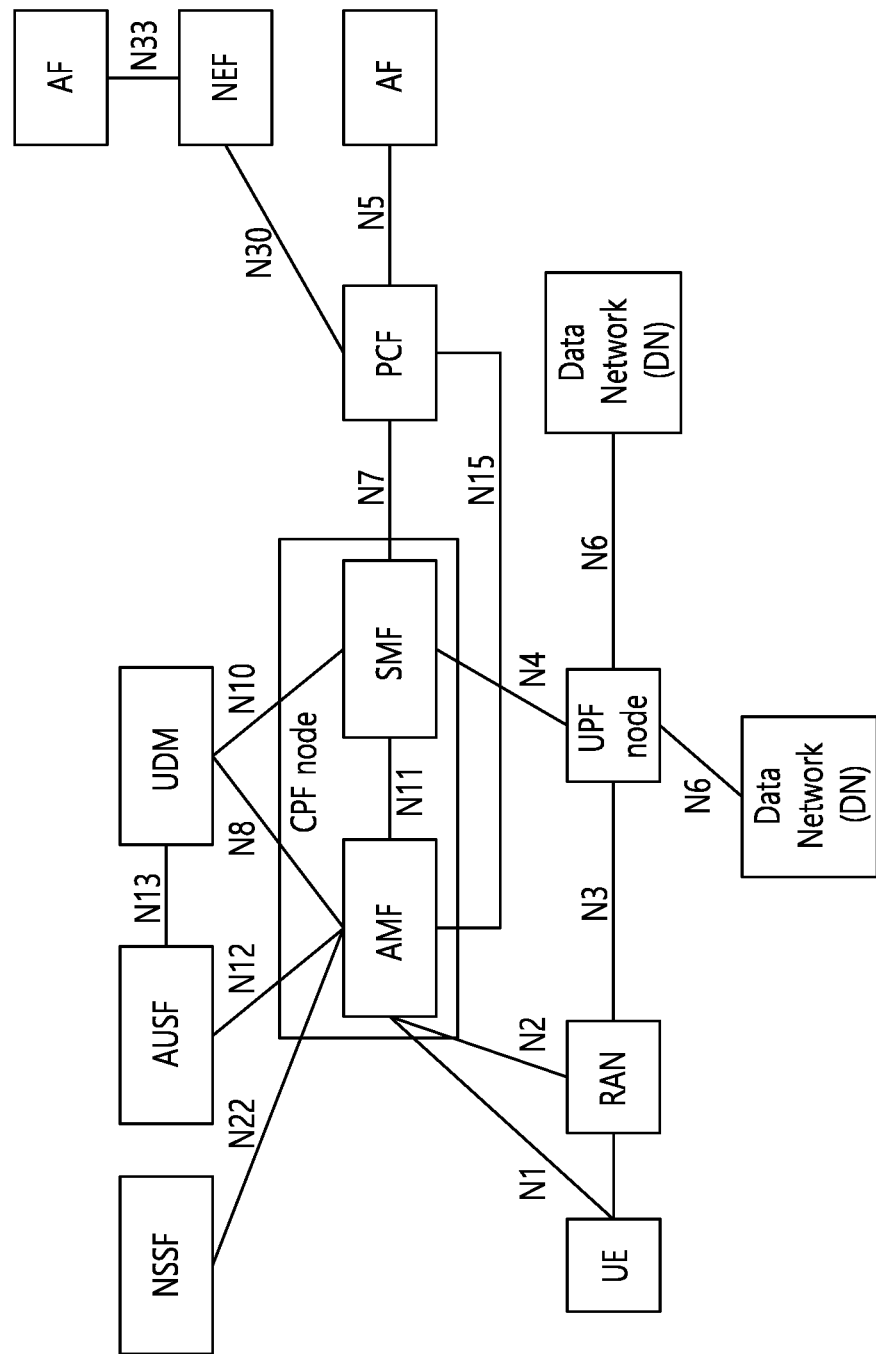
FIG. 4 is an exemplary diagram illustrating an architecture for supporting simultaneous access to two data networks.

In FIG. 4, a UE may simultaneously access two data networks using multiple protocol data unit (PDU) sessions. FIG. 4 is an Exemplary Diagram Illustrating an Architecture for Supporting Simultaneous Access to Two Data Networks.

FIG. 4 shows an architecture for a UE to simultaneously access two data networks using one PDU session.

For reference, a description of the reference point shown in FIGS. 2 to 4 is as follows.

N1: Reference point between UE and AMF
N2: Reference point between NG-RAN and AMF
N3: Reference point between NG-RAN and UPF
N4: Reference point between SMF and UPF
N5: Reference point between PCF and AF
N6: Reference point between UPF and DN
N7: Reference point between SMF and PCF
N8: Reference point between UDM and AMF
N10: Reference point between UDM and SMF
N11: Reference point between AMF and SMF
N12: Reference point between AMF and AUSF
N13: Reference point between UDM and AUSF
N15: In a non-roaming scenario, a reference point between the PCF and the AMF. In a roaming scenario, the reference point between the AMF and the PCF of the visited network
N22: Reference point between AMF and NSSF
N30: Reference point between PCF and NEF
N33: Reference point between AF and NEF In FIGS. 3 and 4, the AF by a third party other than the operator may be connected to the 5GC through the NEF.

Figure 5:
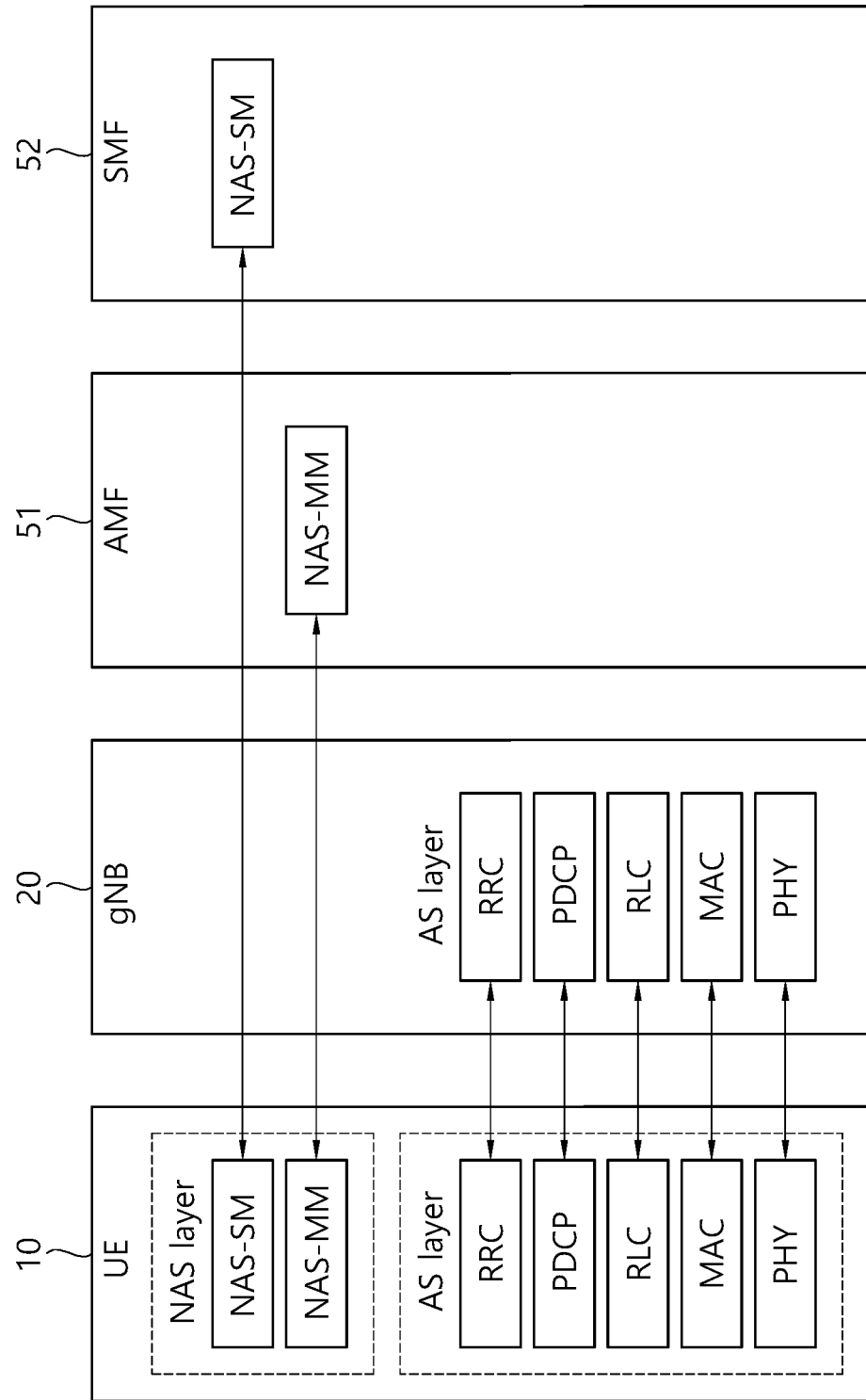
FIG. 5 is another exemplary diagram showing a structure of a radio interface protocol between a UE and a gNB.

FIG. 5 is Another Exemplary Diagram Showing a Structure of a Radio Interface Protocol Between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an access stratum (AS).

On the other hand, in order to achieve the URLLC stipulated in 5GAA (5G Automotive Association) and 5G, it should take less than 5 msec for the server to receive vehicle status information from the vehicle and the vehicle to receive control data from the server and the vehicle to operate. That is, operations that the cloud server to collect in-vehicle sensor data, and after analysis is completed, the cloud server to transmit a control command to the TCU (Telematics Communication Unit), and the TCU to deliver it to the target ECU (Electronic Control Unit) must be completed within 5 msec.

In the conventional cloud server-based network structure (eg, base station-wired network-cloud server), it takes about 30-40 msec for operations that data is transmitted from the base station to the cloud server, the cloud server analyzes the data to transmit the data to the base station, and the base station receives it.

To achieve ultra-reliable and low latency communications (URLLC), the European Telecommunications Standards Institute (ETSI) and 5GAA are discussing Multi-access Edge Computing (MEC).

<Multi-access Edge Computing (MEC)>

MEC is a network architecture that enables cloud computing capabilities and IT service environments at the edge of a cellular network (typically, the edge of any network). The basic idea of MEC is to run applications (applications) and perform processing tasks related to the cellular customer, thereby reducing network congestion and making applications better. MEC technology is designed to be implemented in a cellular base station or other edge node. MEC technology may rapidly and flexibly deploy new applications and new services for customers. MEC enables cellular operators to open a Radio Access network (RAN) to authorized third parties such as application developers and content providers.

The MEC server described in this specification refers to a communication device that provides a cloud computing function or an IT service environment at the edge of a network.

FIGS. 6a to 6d Show an Example Implementation of the MEC Server.

The user plane function (UPF) node 630 of FIGS. 6a to 6d is a type of gateway through which user data is transmitted and received. The UPF node 630 may perform all or part of the user plane functions of a serving-gateway (S-GW) and a packet data network-gateway (P-GW) of 4G mobile communication. The core network 640 may be an Evolved Packet Core (EPC) or a 5G Core Network (5GC). N3 is a reference point between the (R)AN and the UPF node 630. N6 is a reference point between the UPF node 630 and the data network. The base station 620 may be a 5G base station (gNB) or an LTE base station (eNB). The base station 620 may be a base station including both a gNB and an eNB.

The AMF 650 is an Access and Mobility Management Function, and is a Control Plane Function (CPF) for managing access and mobility. The SMF 660 is a Session Management Function and is a control plane function for managing data sessions such as PDU (Protocol Data Unit) sessions.

Logically, the MEC server (MEC host) 610 may be implemented in an edge or central data network. The UPF may perform a role to coordinate user plane (UP) traffic to a target MEC application (application in the MEC server 610) of the data network. The location of the data network and UPF can be selected by the network operator. Network operators may deploy physical computing resources based on technical and business variables such as available facilities, supported applications and application requirements, measured or estimated user loads, and the like. The MEC management system may dynamically determine a location to deploy the MEC application by coordinating the operation of the MEC server 610 (MEC host) and the application.

Figure 6A:
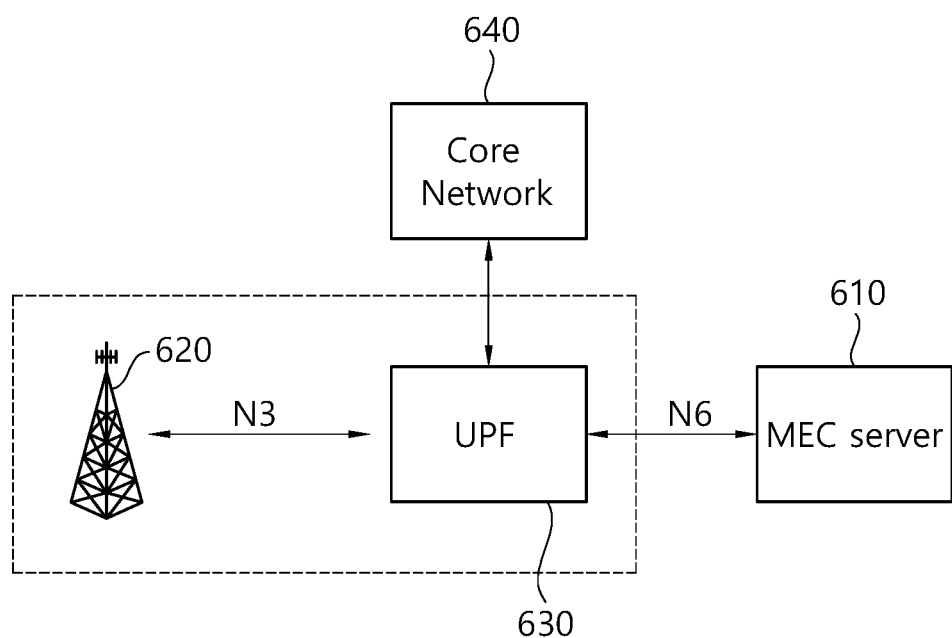
Figure 6C:
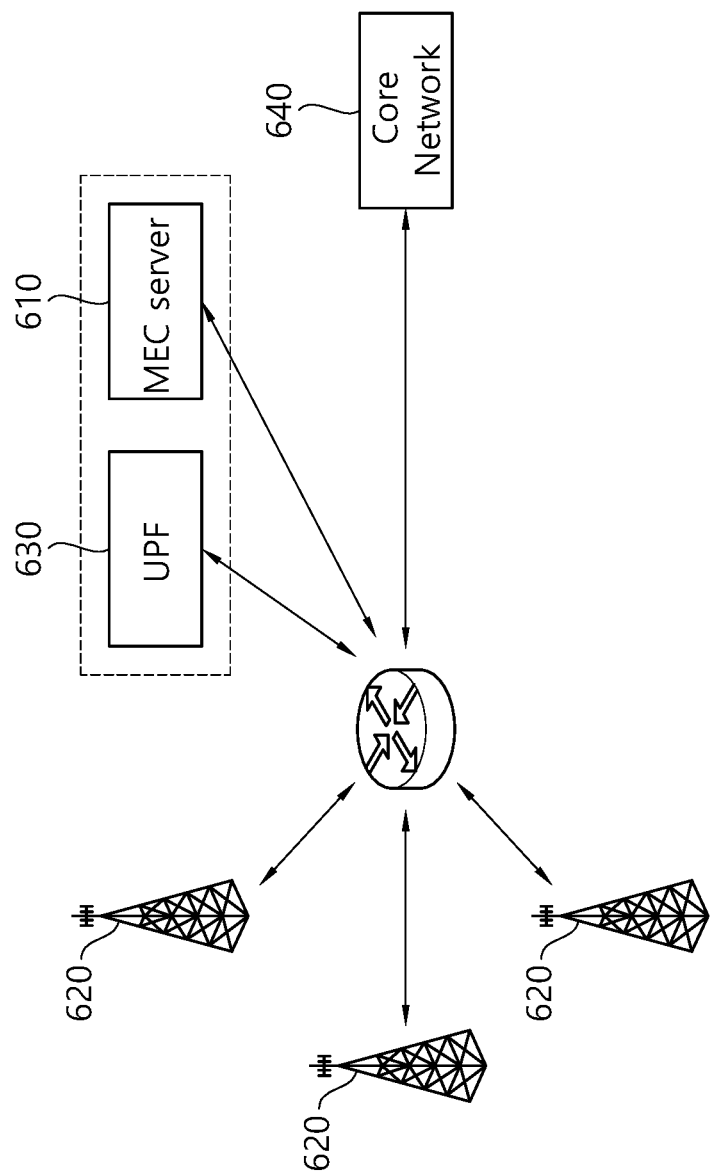
Figure 6D:
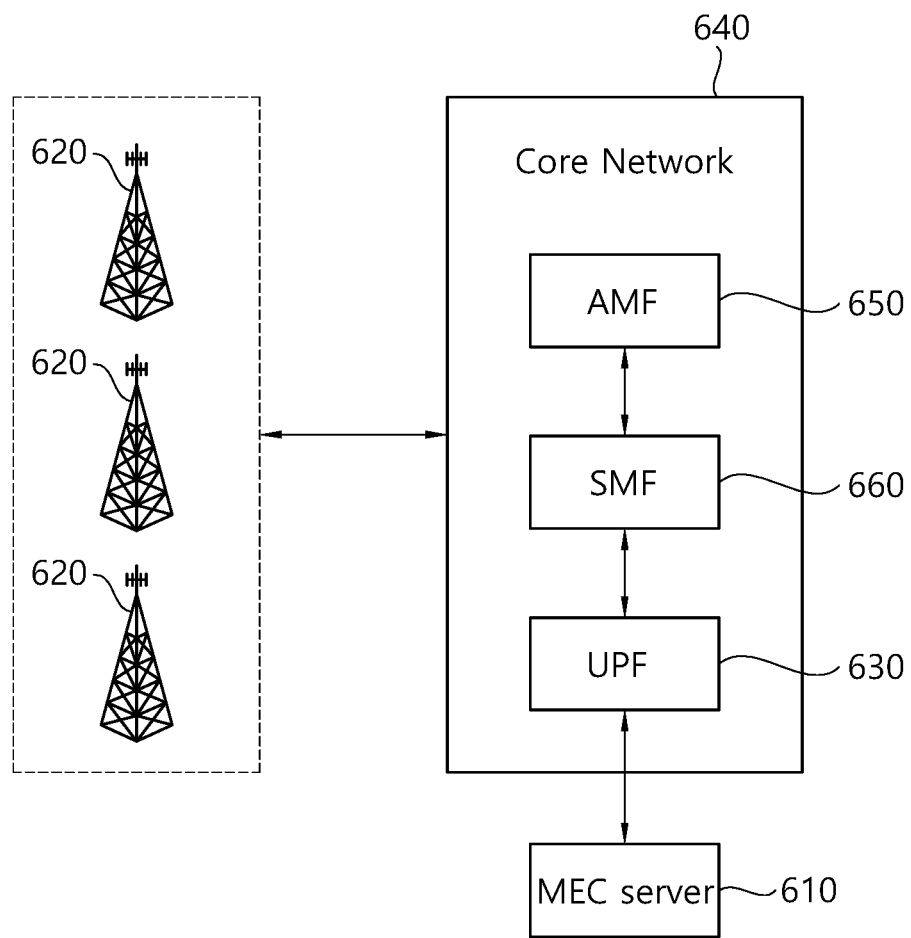

FIG. 6a is an implementation example in which the MEC server 610 and the UPF node 630 are deployed together with the base station 620. FIG. 6b is an example implementation in which the MEC server 610 is co-located with a transmitting node (eg, UPF node 630). In FIG. 6b, the core network 640 may communicate with the UPF node 630 and the MEC server 610 through a network aggregation point. FIG. 6c is an example implementation in which the MEC server 610 and the UPF node 630 are deployed together with a network aggregation point. FIG. 6d is an example implementation in which the MEC server 610 is deployed with core network 640 functions. In FIG. 6d, the MEC server 610 may be deployed in the same data center as the core network 640 functions.

<Disclosure of the Present Specification>

Figure 7:
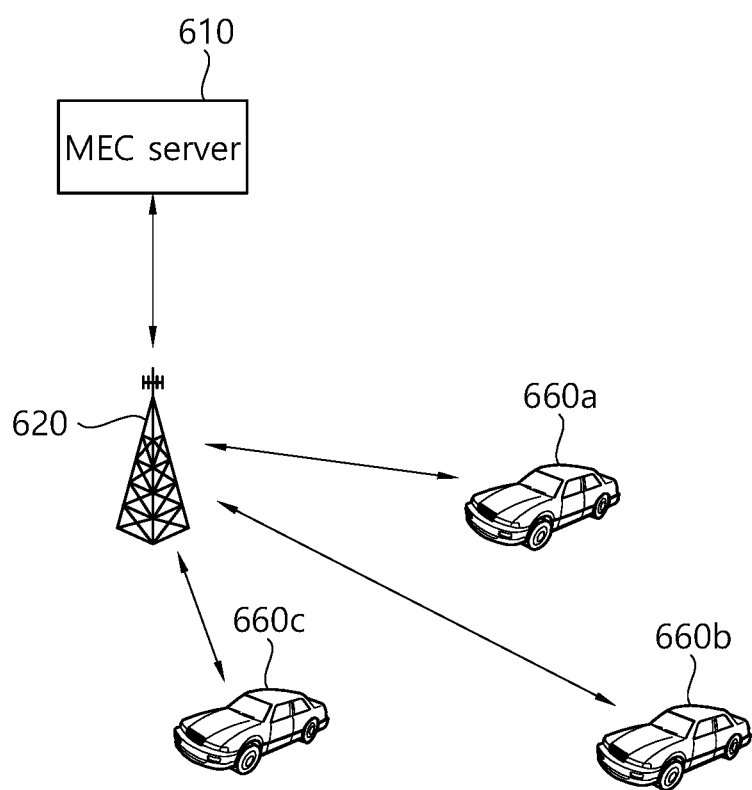
FIG. 7 shows an example in which the MEC server remotely controls the vehicle.

FIG. 7 Shows an Example in which the MEC Server Remotely Controls the Vehicle.

Referring to FIG. 7, an MEC server 610, a base station 620, and vehicles 660a to 660c are shown. The base station 620 may be a gNB or an eNB. The base station 620 may be a base station including both a gNB and an eNB. The MEC server 610 may be connected to the base station 620 through wired communication or wireless communication. The MEC server 610 may transmit data to or receive data from the base station 620. Although the figure shows that the MEC server 610 and the base station 620 are directly connected, this is only an example, and the MEC server 610 may be connected to the base station 620 through another network node. The base station 620 may transmit/receive data to and from a Telematics Communication Unit (TCU) mounted in the vehicles 660a to 660c.

The TCU may obtain status information from devices mounted on the vehicles 660a to 660c, and the status information may include various sensor data, video data, and the like. The TCU may transmit state information (or vehicle-related information including the state information) to the base station 620, and the base station 620 may transmit the state information to the MEC server 610. Then, the MEC server 610 may transmit data for controlling the vehicles 660a to 660c to the base station 620 based on the state information. When the base station 620 transmits data for controlling the vehicles 660a to 660c to the TCU, the TCU may control the vehicles 660a to 660c by transmitting the received data to devices mounted on the vehicles 660a to 660c. Then, the MEC server 610 may transmit map information to the base station 620, and the base station 620 may transmit it to the TCU. The TCU may control the vehicles 660a to 660c using the map information.

A TCU mounted on the MEC server 610 and the vehicles 660a to 660c will be described in detail with reference to FIG. 8.

Figure 8:
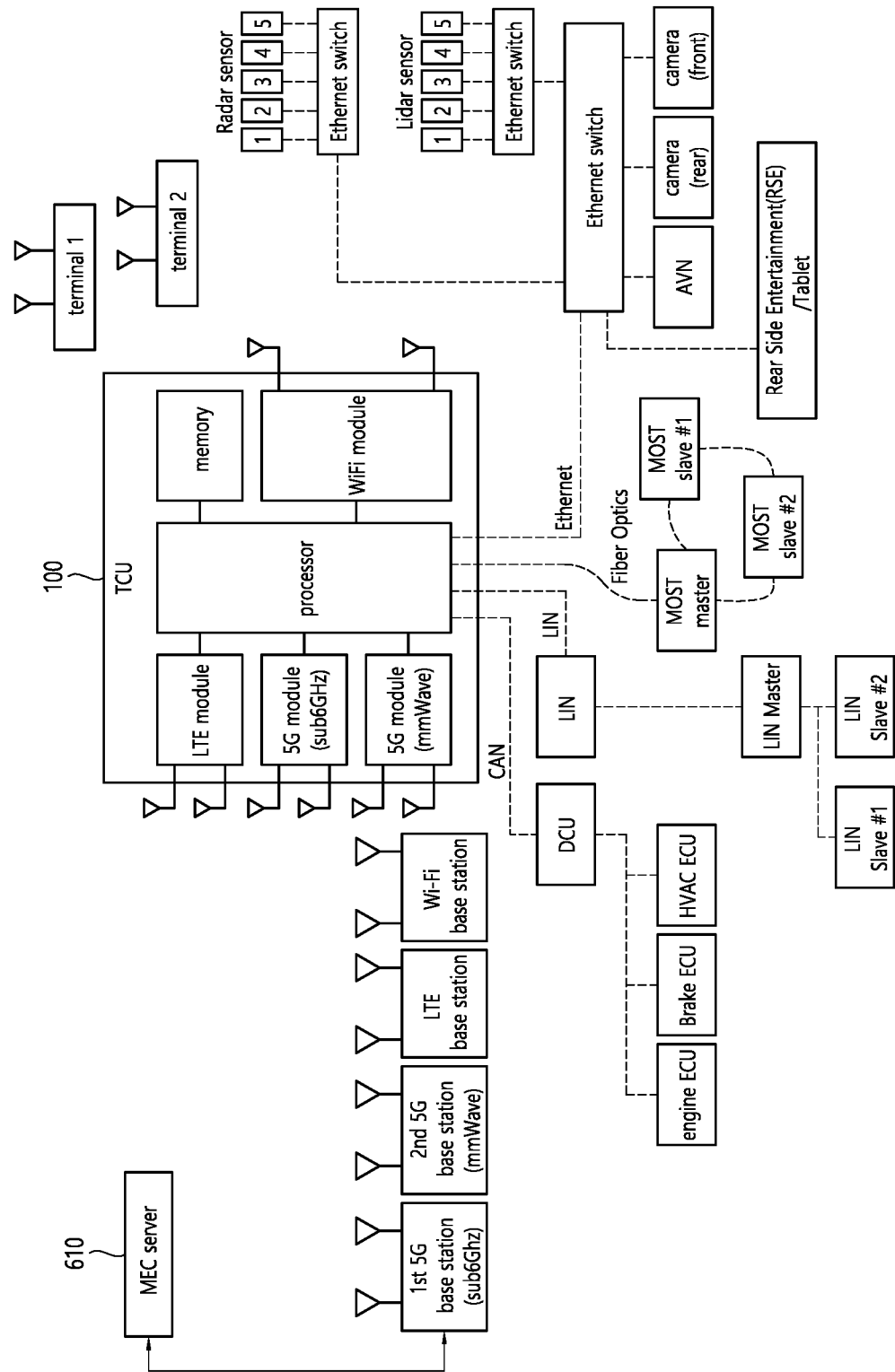
FIG. 8 is a block diagram illustrating an example of an MEC server and an example of a TCU according to the disclosure of the present specification.

FIG. 8 is a Block Diagram Illustrating an Example of an MEC Server and an Example of a TCU According to the Disclosure of the Present Specification.

The MEC server is the MEC server 610 described with reference to FIGS. 6a to 6d and 7, and will be described below by omitting reference numerals. The TCU 100 is a TCU mounted on the vehicles 660a to 660c described with reference to FIG. 7, and will be described below by omitting reference numerals.

The MEC server may be implemented as in the examples described with reference to FIGS. 6a to 6d. Although it is illustrated in FIG. 8 that the MEC server directly communicates with the base stations, this is only an example, and the MEC server may communicate with the base stations through another network node (eg, a UPF node). The MEC server may include a processor (not shown) and a memory (not shown). The memory can store the MEC server app. The processor may perform the operations described in the disclosure of this specification by using the MEC server app stored in the memory. MEC server app is, for example, VR/AR app, video app, camera data analysis app, sensor data analysis app (including lidar sensor data analysis app and radar sensor data analysis app), engine ECU data analysis app, speed ECU data analysis app, HVAC ECU data analysis app, an ECU control app, a control command sending app, a baseball app, a golf app, and the like.

A 5G base station (sub6GHz) is a base station that performs communication based on the 5G standard in the FR1 (Frequency Range 1) band (frequency band below 7125 MHz). A 5G base station (mmWave) is a base station that performs communication based on the 5G standard in the FR2 (Frequency Range 2) band (frequency band of 24250-52600 MHz). The LTE base station is a base station that performs communication based on the LTE standard. A Wi-Fi base station is a base station that performs communication based on the Wi-Fi standard. The MEC server may communicate with the TCU using at least one of a 5G base station (sub6GHz), a 5G base station (mmWave), an LTE base station, and a Wi-Fi base station.

The TCU may include an LTE module, a 5G module (sub6GHz), a 5G module (mmWave), a WiFi module, a processor and a memory. The LTE module is a communication module (ie, a transceiver) that performs communication (transmission/reception of data) based on the LTE standard. The 5G module (sub6GHz) is a communication module (ie, a transceiver) that performs communication (transmission/reception of data) based on the 5G standard in the FR 1 band. The 5G module (mmWave) is a communication module (ie, transceiver) that performs communication (transmission and reception of data) based on the 5G standard in the FR 2 band. The WiFi module is a communication module (ie, a transceiver) that performs communication (transmission and reception of data) based on the WiFi standard. The LTE module, 5G module (sub6GHz), 5G module (mmWave) and WiFi module can be connected with the processor through an interface such as PCIe (PCI express). In addition, although the LTE module, 5G module (sub6GHz), 5G module (mmWave), and WiFi module are each shown as separate objects, but one communication module may perform functions of the LTE module, 5G module (sub6GHz), 5G module (mmWave) and WiFi module.

The processor of TCU is connected with LTE/5G module (sub6GHz), LTE/5G module (mmWave), WiFi module and memory. The memory may store MEC client apps. The processor may receive data transmitted by base stations or terminals (terminal 1 and terminal 2) using an LTE module, a 5G module (sub6GHz), a 5G module (mmWave), and a WiFi module. The processor may transmit data to base stations or terminals (terminal 1 and terminal 2) using an LTE module, a 5G module (sub6GHz), a 5G module (mmWave), and a WiFi module. Here, the terminals (terminal 1 and terminal 2) may be wireless communication devices used by a user in a vehicle. In addition, the processor of the TCU may perform the operations described in the disclosure of this specification by using the MEC client app stored in the memory.

The processor of the TCU may be connected to devices mounted on the vehicle. For example, the processor may be connected to a Domain Control Unit (DCU), a Local Interconnect Network (LIN) master, a Media Oriented System Transport (MOST) master, and an Ethernet switch. The processor of the TCU may communicate with the DCU using CAN (Controller Area Network) communication technology. The processor of the TCU can communicate with the LIN master using LIN (Local Interconnect Network) communication technology. The processor of the TCU can communicate with the MOST master connected by fiber optics using MOST communication technology. The processor of the TCU can communicate with the Ethernet switch and devices connected to the Ethernet switch using Ethernet communication technology.

The DCU is a device that controls a plurality of ECUs. The DCU can communicate with a plurality of ECUs using CAN communication technology. Here, CAN is a standard communication technology designed for microcontrollers or devices to communicate with each other in a vehicle. CAN is a non-host bus type, message-based network protocol mainly used for communication between controllers.

The DCU may communicate with an ECU such as an engine ECU that controls the engine, a brake ECU that controls brakes, and an HVAC ECU that controls a heating, ventilation, & air conditioning (HVAC) device, etc. The DCU can transmit data received from the processor of the TCU to each ECU. In addition, the DCU can transmit the data received from each ECU to the processor of the TCU.

The LIN master may communicate with LIN slaves (LIN Slave #1 and LIN Slave #2) using LIN communication technology. For example, LIN Slave #1 may be a slave that controls one of a steering wheel, a roof top, a door, a seat, and a small motor. Here, LIN is a serial communication technology for communication between components in an automobile network. The LIN master may receive data from the processor of the TCU and transmit it to the LIN slaves (LIN Slave #1 and LIN Slave #2). In addition, the LIN master may transmit data received from the LIN slaves to the processor of the TCU.

The MOST master may communicate with the MOST slaves (MOST Slave #1 and MOST Slave #2) using MOST communication technology. Here, MOST is a serial communication technology that transmits audio, video, and control information using an optical cable. The MOST master may transmit data received from the processor of the TCU to the MOST slaves. Also, the MOST master can transmit data received from the MOST slaves to the processor of the TCU.

Ethernet is a computer networking technology used in local area networks (LAN), metropolitan area networks (MAN), and wide area networks (WAN). The processor of the TCU can transmit data to each device through an Ethernet switch using Ethernet communication technology. Each device can transmit data to the processor of the TCU through an Ethernet switch using Ethernet communication technology.

Radar (radio detection and ranging) is a technology for measuring the distance, direction, angle, and velocity of a target using radio waves. The radar sensors 1 to 5 are provided in the vehicle to measure the distance, direction, angle, and speed of objects around the vehicle. The radar sensors 1 to 5 may transmit the measured sensor data to the processor of the TCU.

LiDAR (light detection and ranging) is a sensing technology that uses a light source and a receiver to detect a remote object and measure a distance. Specifically, lidar is a technology that measures the distance, intensity, speed, etc. to the target by illuminating the target with pulsed laser light and measuring the pulse reflected by the sensor. The lidar sensors 1 to 5 measure the distance to the target, speed, and the like. The lidar sensors 1 to 5 may transmit the measured sensor data to the processor of the TCU.

For reference, although radar sensors and lidar sensors are illustrated in FIG. 8 as using Ethernet communication technology, the radar sensors and lidar sensors may also use CAN communication technology.

AVN (Audio, Video, Navigation) is a device provided in a vehicle to provide sound, video, and navigation. AVN may receive data from the processor of the TCU using Ethernet communication technology, and provide sound, image, and navigation based on the received data. AVN can transmit data to the processor of the TCU using Ethernet communication technology.

The camera (front) and the camera (rear) can capture images from the front and rear of the vehicle. Although it is illustrated in FIG. 8 that there is one camera in the front and one in the rear, this is only an example, and cameras may be provided on the left and right sides. In addition, a plurality of cameras may be provided in each of the front and rear. The cameras may transmit camera data to, and receive data from, the processor of the TCU using Ethernet communication technology.

Rear Side Entertainment (RSE) means rear seat entertainment. RSE is a device installed behind the passenger seat or behind the driver's seat of a vehicle to provide entertainment to the occupants. A tablet may also be provided inside the vehicle. The RSE or tablet may receive data from the processor of the TCU and transmit the data to the processor of the TCU using Ethernet communication technology.

In the conventional cloud server-based network structure (eg, base station-wired network-cloud server), it takes about 30-40 msec for that data is transmitted from the base station to the cloud server, the cloud server analyzes the data to transmit the data to the base station, and the base station receives it.

Specifically, a person remotely controls a vehicle through a conventional cloud server (Remote Driving Control), or a conventional cloud server analyzes data of the vehicle's front camera/rear camera/various sensors and mounted on the vehicle's ECU, etc, and the conventional cloud server can remotely control devices. At this time, if the device mounted on the vehicle or the user's terminal is using a high-capacity real-time data service (multimedia data such as VR/AR, 8K video streaming, etc.), the possibility of an accident may increase because the operation (brake/speed/direction control, etc.) to control the vehicle by transmitting the remote control data to the devices mounted on the vehicle within 5 msec cannot be performed.

The MEC server according to the disclosure of the present specification can perform a function of receiving/storing/transmitting/analyzing various data such as video(camera)/audio/sensor data performed in a conventional cloud server, and a function of managing the TCU and devices mounted on the vehicle.

In the MEC server according to the disclosure of the present specification, there may be an MEC server application (MEC server app) for performing operations according to various purposes. The MEC server may perform the operations described in the disclosure of this specification by using the MEC server application.

In addition, in the TCU according to the disclosure of the present specification, there may be an MEC client application (MEC client app) for performing operations according to various purposes. The TCU may use the MEC client application to perform the operations described in the disclosure of this specification.

The operations of the MEC server, the mobile communication network, and the TCU to be described in the disclosure of the present specification are briefly described below. However, the following description is merely an example, and operations of the MEC server, the mobile communication network, and the TCU will be described in detail with reference to FIGS. 9 to 15.

The MEC server monitors the operation of the TCU and ECU in the vehicle to comply with regulations such as the Road Traffic Act, ISO26262 (Standard related to industrial safety, Road vehicles—Functional safety) or SAE (System Architecture Evolution) standards. If the operation of the TCU and the ECU in the vehicle violates regulations, the MEC server controls the operation of the ECU in the vehicle based on a predefined scenario.

The MEC server may analyzes vehicle-related information (eg, the status information of devices installed in the vehicle such as engine ECU-related data, RPM (revolutions per minute) ECU-related data, wheel-related data, brake-related data, HVAC (heating, ventilation & air conditioning) related data, etc) received from the TCU in the vehicle, and controls the operation of devices in the vehicle connected to the TCU based on a predefined operation scenario.

When the MEC server transmits control data for a plurality of target devices in the vehicle at once, the TCU may transmit data frames, which is based on a plurality of communication technologies (CAN/LIN/Flexray/MOST/Ethernet), by combining the data frames in one message. in order to efficiently transmit control data to the plurality of target devices. The TCU may transmit a data frame based on each communication technology to a target device in the vehicle (eg, a controller/master such as ECU, a LIN master). The TCU transmits the execution result of the control data provided from the MEC server to the MEC server, and the MEC server can determine the failure/success of the control data transmission (FAIL/SUCCESS).

If the result of the target device (the device that will receive the data sent by the MEC server) executing the control data (sent by the MEC server) is FAIL or there is a delay in the target device, the MEC server may retransmit the same control data for a predetermined number of times (eg, 10). In this case, the MEC server may retransmit the control data using the beam having the highest data rate.

To secure safety, the MEC server may retransmit the same control command by selecting at least one beam of the beams with the highest data rate among the beams of the 5G_sub6Ghz base station, the beam with the highest data rate among the beams of the 5G_mmWave base station, and the beam with the highest data rate among the beams of the LTE base station.

The MEC server may monitor the operating state of the TCU and determine the current state of the TCU. For example, the MEC server may monitor the operation state of the TCU, and determine the current state of the TUC as one of inactive, active, sleeping, and moving.

The MEC server may receive vehicle-related information (eg, vehicle location-related information) from the TCU and manage the vehicle location (eg, collect/analyze/control/record).

The MEC server may receive vehicle-related information (eg, vehicle speed-related information) from the TCU and manage (eg, collect/analyze/control/record) vehicle speed-related information. The MEC server manages information related to the speed of the vehicle to determine whether the vehicle is overspeeding, whether the vehicle complies with a safe speed, and the like.

The MEC server may receive vehicle-related information (eg, engine ECU information) from the TCU and manage (eg, collect/analyze/control/record) engine ECU (Engine controlling ECU) information.

The MEC server receives vehicle-related information (eg, information received from sensors and cameras mounted on the vehicle) from the TCU and manages (eg. collected/analyzed/controlled/recorded) information of vehicle sensor and camera (Lidar, Radar, and front/rear/measurement/cabin cameras).

As a result of analyzing vehicle sensor and camera information, if a vehicle collision with pedestrians, obstacles, etc is expected, the MEC server controls the ECU (engine ECU, brake ECU, etc.) in the vehicle by transmitting control data to the TCU based on the emergency response scenario.

In order to distinguish control data (data based on ECU, MOST, LIN, FlexRay, etc.) and general data used for multimedia services (high-capacity real-time data such as AR/VR/video/audio) transmitted to devices (ECU, etc.) mounted on the vehicle, the MEC server may transmit a message including a tag for each type of data, which to be transmitted to the TCU, to the TCU.

After checking the tag of the data included in the message received from the MEC server, the TCU may first store the control data used for vehicle control in the buffer of the memory. In addition, the TCU may transmit control data from a memory to a device such as an ECU controller, and thereafter, high-capacity real-time data (ie, general data) may be transmitted after transmitting the control data.

When there is a large number of control data received from the MEC server, the TCU may transmit the control data of the highest priority to the device mounted on the vehicle according to the priority of the tag of the control data.

The MEC server may transmit general data to the TCU so that a timeout does not occur for each service of general data in consideration of requirements (delay time, etc.) of general data.

In addition, in consideration of the general data requirements (delay time, etc.), the TCU can also transmit the general data received from the MEC server to the devices mounted on the vehicle so that a timeout does not occur for each service of general data.

For reference, in the present specification, control data refers to data including commands for controlling an autonomous driving-related device and a device controlling vehicle among devices mounted on a vehicle. The control data may include, for example, data based on communication technologies such as CAN, LIN, Flexray, and MOST, and data related to terrain used for autonomous driving, such as HD-MAP.

In the present specification, general data means data to be transmitted to a device not directly related to autonomous driving among devices mounted on a vehicle and to a terminal of a user riding in the vehicle. General data includes data related to multimedia services (AR/VR/video/audio) and other high-capacity real-time data.

As described in the background section, there is no existing method by which data transmission/reception between the MEC server and the TCU mounted on the vehicle can be performed quickly and efficiently.

For example, when a user riding in a vehicle equipped with a TCU uses a multimedia service such as VR, AR, 4K video, or 8K video, the data rate required for the multimedia service may be 25 to 30 Gbps or more. At this time, even if the TCU receives data using the antenna of the mmWave 5G module, a data rate of 20 Gbps or more may not be satisfied.

For another example, the Ethernet communication speed of the TCU may vary according to the implementation of the TCU, such as 100 Mbps, 1 Gbps, 10 Gbps. A user in a vehicle may want to use a multimedia service that is higher than the Ethernet communication speed of the TCU. Then, the TCU requests data related to the multimedia service from the MEC server, even though the Ethernet communication speed of the TCU is less than the data rate required for the multimedia service. Accordingly, in the prior art, the MEC server receives data from the cloud server related to the multimedia service without considering the Ethernet communication speed of the TCU and transmits the received data to the TCU. Then, the TCU could not properly provide the multimedia service to the user because the TCU receives data having a data rate higher than the Ethernet communication speed of the TCU.

As another example, the MEC server did not consider the type of data when determining a transmission beam used when transmitting data to the TCU. For example, control data such as brake ECU control data or engine ECU control data related to safety needs to be transmitted to the TCU quickly. However, conventionally, the MEC server does not guarantee vehicle safety by allocating a transmission beam without considering the type of data.

The disclosure of the present specification proposes a method for solving the above-described problems.

Hereinafter, operations of the MEC server, the TCU, and the mobile communication network (including the base station) according to the disclosure of the present specification will be described in detail with reference to FIGS. 9 to 15. Hereinafter, the disclosure of the present specification will be described focusing on a case in which one TCU exists, but this is only an example, and operations described in the present disclosure may be applied even when a plurality of TCUs exist.

Figure 9:
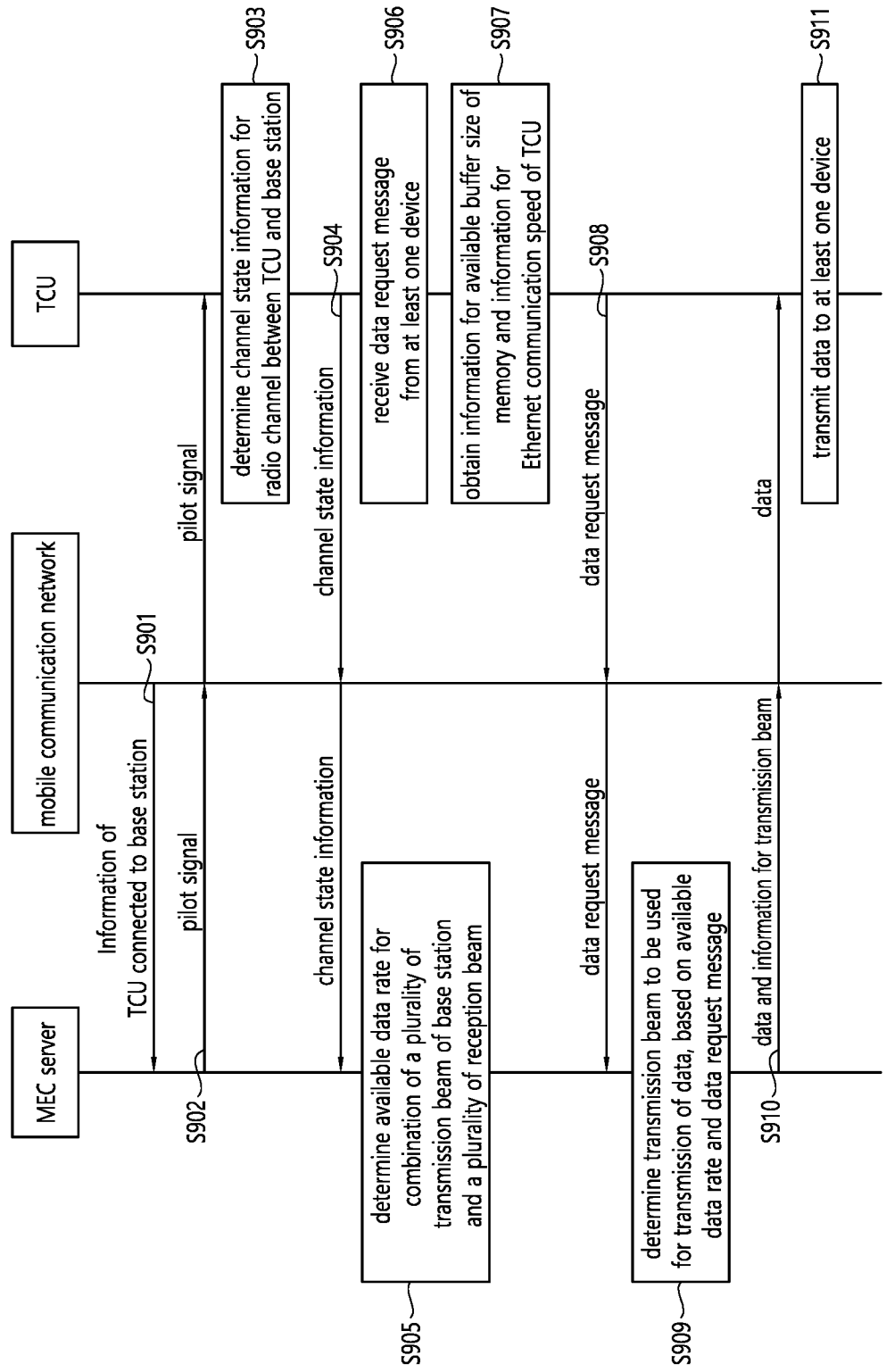
FIG. 9 is a signal flow diagram illustrating an example of the operation of the TCU, the MEC server, and the mobile communication network according to the disclosure of the present specification.

FIG. 9 is a signal flow diagram illustrating an example of the operation of the TCU, the MEC server, and the mobile communication network according to the disclosure of the present specification.

When the TCU is powered on and an OS (Operating System) such as Linux is booted, the TCU can execute the MEC client app according to the boot sequence. When the TCU executes the MEC client app, it can check whether the devices in the TCU are loaded and operated. In addition, the TCU may read the ID of each in-vehicle device such as each controller, master, and slave that communicates with the TCU and a set value for each ID of each device. Here, the ID may include an ECU ID, a slave ID, and the like.

The TCU may check the transmission speed of the Ethernet controller using the MEC client app. That is, the TCU may check the Ethernet communication speed of the TCU. Here, the Ethernet communication speed of the TCU may vary, such as 1 Gbps, 10 Gbps, 100 Mbps.

When the TCU is powered on, each device in the vehicle may run an app used by each device according to the booting sequence. And, when each device completes the booting sequence, it may notify the TCU that booting is complete. For example, in the case of RSE, when the power of the TCU is turned on, the RSE executes the RSE agent application according to the boot sequence and may perform the initialization process. Here, the initialization process may include loading an Ethernet driver of the RSE, displaying a graphical user interface (GUI) screen of the RSE, and the like. And, the RSE may inform the TCU that booting is complete using Ethernet communication.

Devices in the vehicle may request data from the TCU according to the operation of each device or the user's manipulation. This will be described in detail in step S906.

As an example, the VR device may monitor the content (ie, VR service) requested by the user by using a VR agent application (VR app) stored in a memory in the VR device. When the user selects specific content through the VR device, the VR device may transmit the ID of the content requested by the user (the ID of the VR service) and may transmit information for the data rate requested by the corresponding content to the TCU, by using the VR app. Then, the TCU may transmit a data request message related to the VR content to the MEC server using the MEC client app.

As another example, when the user touches the RSE to request a specific 8K video playback, the RSE may transmit the ID of the video service requested by the user and the data rate of the corresponding video service to the TCU. Then, the TCU may transmit a data request message related to the video service of the RSE to the MEC server.

Referring to FIG. 9, in step S901, the MEC server may receive TCU information connected to the base station from a mobile communication network including the base station. Hereinafter, a mobile communication network means a mobile communication network including a base station. The MEC server may receive information on all TCUs connected to the base station. The TCU information may include a list of TCU IDs, information on a channel between the TCU and the base station, timing information on communication between the TCU and the base station, and the like. In addition, the TCU information may further include information on a service list for each TCU, a delay requirement for each service for each TCU, and a minimum data rate requirement for each service for each TCU.

In step S902, the MEC server may transmit a pilot signal to the mobile communication network, and the base station included in the mobile communication network may transmit the pilot signal to the TCU. The MEC server may broadcast a pilot signal by using at least one transmit beam of a 5G base station (sub 6Ghz), at least one transmit beam of a 5G base station (mmWave), at least one transmit beam of an LTE base station, and at least one transmit beam of a WiFi base station using.

In step S903, the TCU may determine channel state information for a radio channel between the TCU and the base station based on the received pilot signal. Here, the channel state information may be a channel quality indicator (CQI).

In step S904, the TCU may transmit channel state information to the base station. Then, the mobile communication network may transmit the channel state information to the MEC server.

In step S905, the MEC server may determine an available data rate for a combination of the plurality of transmit beams of the base station and the plurality of receive beams of the TCU.

For example, the MEC server may determine an available data rate group as shown in Table 1 below based on the channel state information.

TABLE 1

$R(t) = \{R_{i,1,1}(t), R_{i,1,2}(t), R_{i,j,k}(t), \ldots, R_{i,1,U}(t),$
$R_{i,2,1}(t), R_{i,2,2}(t), R_{i,j,k}(t), \ldots, R_{i,2,X}(t),$
$R_{i,3,1}(t), R_{i,3,2}(t), R_{i,j,k}(t), \ldots, R_{i,3,Y}(t),$
$R_{i,4,1}(t), R_{i,4,2}(t), R_{i,j,k}(t), \ldots, R_{i,4,Z}(t)\}$ t may be a time point at which the MEC server determines the data rate. Here, i may be an index indicating the ID of the TCU, j may be an index indicating the type of the base station, and k may be an index indicating the order number of the transmission beam in each base station.

t may be a time point at which the TCU determines the data rate. Here, i may be an index indicating a TCU, j may be an index indicating a type of a base station, and k may be an index indicating a sequence number of a transmission beam in each base station.

For example, the example of j is as follows.
j=1: 5G base station (mmWave)
j=2: 5G base station (sub6Ghz)
j=3: LTE base station
j=4: WiFi base station k may exist for each base station as much as the maximum number of beams of the corresponding base station. For example, when the maximum number of beams of the 5G base station (mmWave) is U, it may be j=1, k=1~U. When the maximum number of beams of the 5G base station (sub6Ghz) is X, it may be j=2, k=1~X. When the maximum number of beams of the LTE base station is Y, it may be j=3, k=1~Y. When the maximum number of beams of the WiFi base station is Z, k=1 to Z may be when j=4.

In step S906, the TCU may receive a data request message from at least one device mounted on the vehicle. Devices in the vehicle may request data from the TCU according to the operation of each device or the user's manipulation.

As an example, the VR device may monitor the content (ie, VR service) requested by the user by using a VR agent application (VR app) stored in a memory in the VR device. When the user selects specific content through the VR device, the VR device may transmit the ID (the ID of the VR service) of the content requested by the user and information for the data rate requested by the corresponding content to the TCU, by using the VR app. Then, the TCU may transmit a data request message related to the VR content to the MEC server using the MEC client app.

As another example, when the user touches the RSE to request to play a specific 8K video, the RSE may transmit the ID of the video service requested by the user and the data rate of the corresponding video service to the TCU. Then, the TCU may transmit a data request message related to the video service of the RSE to the MEC server.

As a specific example, when the MEC server communicates with a plurality of TCUs, each of the TCUs may receive a data request message from at least one device mounted on the vehicle as shown in Table 2 below.

[Table 2]

| TCU index i | service list (service index s) | delay requirements | Minimum data rate requirements $S_{i,s}(t)$ |
|---|---|---|---|
| 1 | VR (s = 1) | 10 msec | $S_{1,1}(t)$ = 5 Gbps |
|   | Audio (s = 2) | 100 msec | $S_{1,2}(t)$ = 100 kbps |
| 2 | VR (s = 1) | 5 msec | $S_{2,1}(t)$ = 10 Gbps |
|   | Video (s = 2) | 150 msec | $S_{2,2}(t)$ = 1 Gbps |
| 3 | VR (s = 1) | 20 msec | $S_{3,1}(t)$ = 25 Gbps |
|   | Control data related to safety (Brake ECU control data) (s = 2) | 2 msec | $S_{3,2}(t)$ = 400 kbps |
|   | Control data related to safety (engine ECU control data) (s = 3) | 3 msec | $S_{3,3}(t)$ = 200 kbps |

Table 2 shows an example of the services and requirements of each of the three TCUs communicating with the MEC server. In Table 2, $S_{i,s}(t)$ represents the minimum data rate requirement. Here, i is a TCU index, and s is an index of a service related to data requested by each TCU.

VR service, audio service, and video service are examples of services related to general data. Brake ECU control data and engine ECU control data are examples of services related to control data. Among the control data, there may be control data related to safety during vehicle driving. For example, the control data related to safety may be control data related to the speed and direction of the vehicle, such as brake ECU control data, engine ECU control data, steering wheel LIN control data, and the like.

Referring to Table 2, TCU-1 (a TCU with i=1) may receive a data request message from a VR device and an AVN. The data request message received by the TCU-1 from the VR device may include information on the delay requirement (10 ms) of the VR service and information on the minimum data rate requirement ($S_{1,1}(t)$=5 Gbps). In addition, the data request message received by the TCU-1 from the AVN may include information on the delay requirement (100 ms) of the audio service and information on the minimum data rate requirement ($S_{1,2}(t)$=100 kbps).

In step S907, the TCU may obtain information on the Ethernet communication speed of the TCU and information on the available buffer size of the memory. For reference, since the TCU may previously obtain information on the Ethernet communication speed of the TCU when the TCU is powered on, the operation of obtaining information on the Ethernet communication speed in step S907 may be omitted.

In addition, the TCU may also obtain information about the total buffer size of the memory of the TCU. The available buffer size at the time t, which is a time that the TCU obtains information on the available buffer size, may be defined as $B_i(t)$. The available buffer size $B_i(t)$ of the TCU at time t is divided into a downlink data storage buffer ($B_{i,d}(t)$) and an uplink data storage buffer ($B_{i,u}(t)$). The buffer ($B_i(t)$) is divided into $B_{i,d}(t)$ and $B_{i,u}(t)$ according to the amount of uplink data and the amount of downlink data. $B_{i,d}(t)$ is used for TCU to transmit the data to the Ethernet controller and each ECU after the TCU buffers data downloaded from the MEC server. $B_{i,u}(t)$ is used by the TCU to upload data to the MEC server through the base station through the 5G transceiver (mmWave, sub6Ghz), LTE transceiver and WiFi transceiver after the TCU stores the data received from various ECU controllers and Ethernet controllers. In addition, the Ethernet communication speed of the TCU at the time t, which is time that the TCU obtains information on the Ethernet communication speed of the TCU, may be defined as $E_i(t)$. Here, since the Ethernet communication speed is a predetermined value in hardware aspects according to the implementation of the TCU, it may not change with time.

In step S908, the TCU transmits a data request message to the base station, and the mobile communication network may transmit the data request message to the MEC server. The data request message may include a data request message for at least one of general data and control data. Taking Table 2 as an example, the data request messages transmitted by TCU-1 and TCU-2 may include only data request messages for general data. In addition, the data request message transmitted by the TCU-3 may include both a data request message for control data and a data request message for general data.

Here, the data request message may include at least one of information on the Ethernet communication speed of the TCU, information on the type of data requested by the TCU, or information on the minimum data rate of data requested by the TCU. Here, the information on the type of data may include information on whether the type of data requested by the TCU to the MEC server is general data or control data, as shown in the example of Table 2. In addition, the information on the type of data may include information on the service related to the data requested by the TCU as shown in Table 2 example.

Taking the case of TCU-3 in Table 2 as an example, the data request message of TCU-3 may include information on the type of data (i) VR service related to general data (s=1), ii) brake ECU control data (s=2) related to control data and engine ECU control data (s=3)), information on the delay requirements of each service (delay requirement of s=1 is 20 ms, delay requirement of s=2 is 2 ms, s=3 delay requirement is 3 ms) and information about the minimum data rate of data required by TCU-3 ($S_{3,i}(t)$=25 Gbps, $S_{3,2}(t)$=400 kbps and $S_{3,3}(t)$=200 kbps).

When the data request message includes a request for general data such as VR service or RSE service, the MEC server may transmit a data request message to a cloud server related to the general data.

For example, the MEC server request data for VR service from the VR cloud server, by transmitting the ID (or content ID) and information about the image quality (eg 8K, 60 frame/sec) of the VR service requested by the TCU, and information about the data rate by using the MEC server VR app. For another example, the MEC server uses the MEC server video app to transmit the ID (or content ID), information for image quality (eg 4K, 60 frame/sec), information for data rate, request data for video service requested by the RSE, tablet, or terminal in the vehicle, such that the MEC server request data for a video service.

In step S909, the MEC server may determine a transmission beam to be used for data transmission based on the data request message and the available data rate.

Based on the data request message and the available data rate, the MEC server may determine the optimal combination of transmission beams that can provide the data requested by the TCU among a combination of a transmit beam of a 5G base station (sub 6Ghz), a transmit beam of a 5G base station (mmWave), a transmit beam of an LTE base station, and a transmit beam of a WiFi base station. That is, the MEC server may determine a combination of transmission beams that can satisfy the data requirements requested by the TCU.

A specific example of step S909 will be described below with reference to FIG. 11.

In step S910, the MEC server may transmit data and information about the transmission beam to the mobile communication network. The information on the transmission beam may be used by the base station to determine the transmission beam to be used for data transmission. The base station may transmit data to the TCU using the transmission beam determined by the MEC server based on the information on the transmission beam.

In step S911, the TCU may transmit the received data to at least one device. Taking TCU-2 of Table 2 as an example, the TCU-2 may receive general data (VR service-related data and video service-related data) from the MEC server, and transmit the received general data to the VR device and the RSE.

Figure 10:
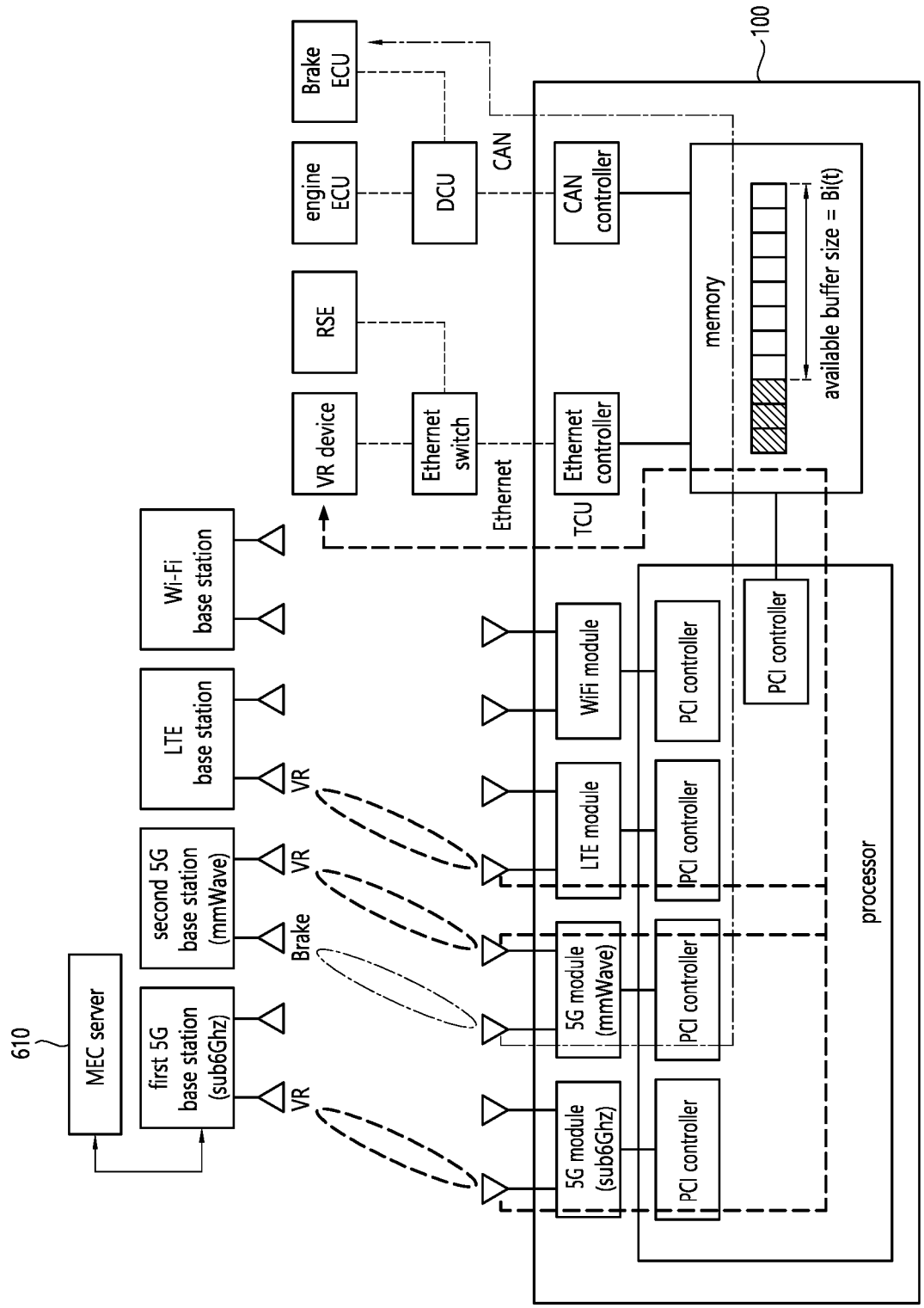
FIG. 10 shows an example in which the MEC server transmits control data and general data to the TCU.

FIG. 10 Shows an Example in Which the MEC Server Transmits Control Data and General Data to the TCU.

FIG. 10 shows an example in which the MEC server transmits control data and general data according to the operations of the MEC server, the mobile communication network, and the TCU described in FIG. 9.

The example of FIG. 10 describes a case in which the TCU transmits a data request message for general data related to the VR service and brake ECU control data in step S908 of FIG. 9.

When the MEC server receives the data request message, the MEC server may perform the operation described in step S909. The MEC server may transmit brake ECU control data using the transmission beam of the second 5G base station (mmWave) having the highest data rate. And, the MEC server may transmit general data related to the VR service using one transmit beam of the first 5G base station (sub 6Ghz), one transmit beam of the second 5G base station (mmWave), and one transmit beam of the LTE base station.

The processor of the TCU may receive general data and control data using the receive beam of the LTE module, the receive beam of the 5G module (sub6GHz), and the receive beam of the 5G module (mmWave). In addition, after the processor buffers the general data and control data in the memory, the processor may transmit the general data and control data to the VR device and the brake ECU.

Figure 11:
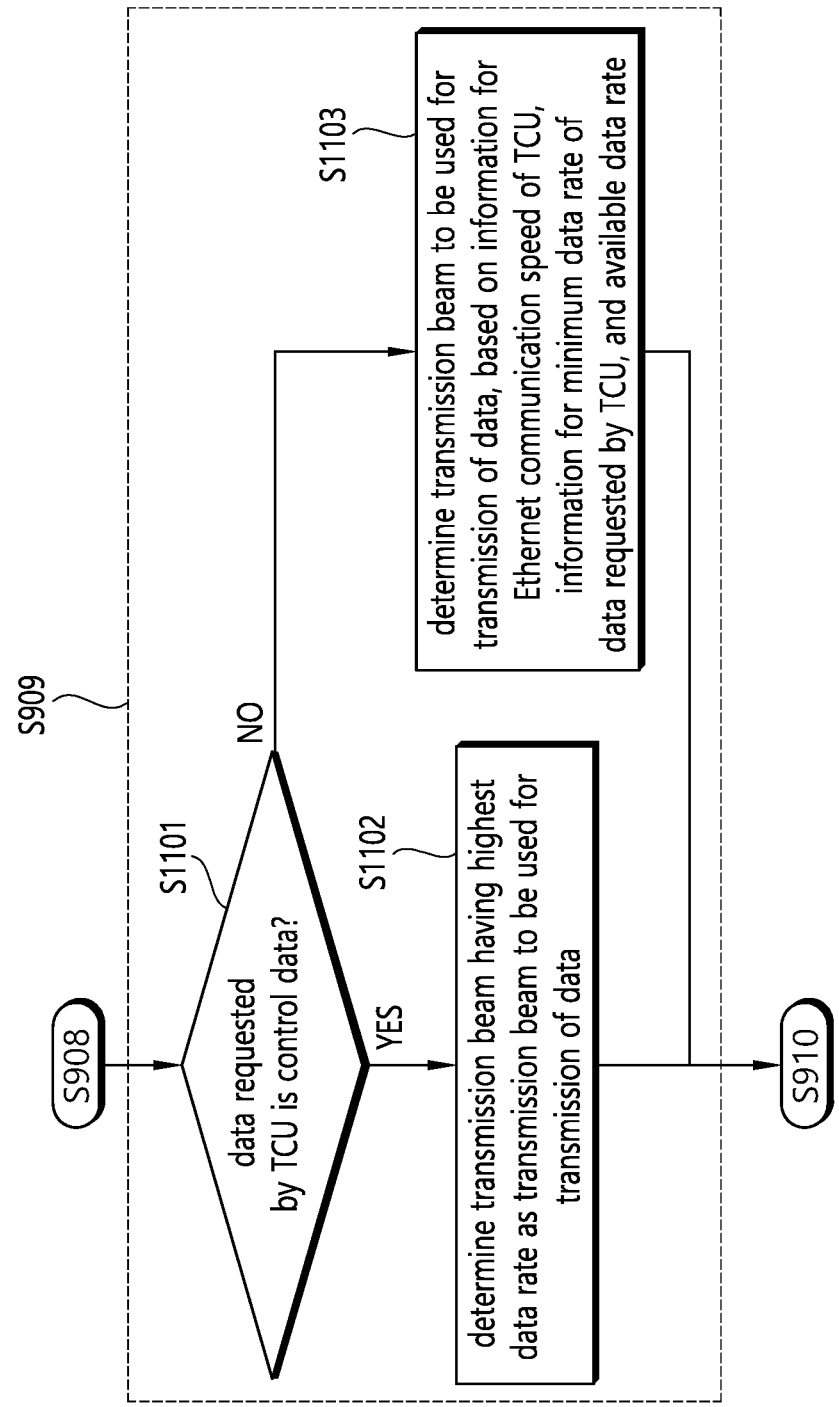
FIG. 11 is a flowchart illustrating an example of step S909 of FIG. 9.

FIG. 11 is a Flowchart Illustrating an Example of Step S909 of FIG. 9.

Referring to FIG. 11, in step S1101, the MEC server may determine whether data requested by the TCU is control data. When the data requested by the TCU is control data, the MEC server may perform step S1102. If the data control data requested by the TCU is not control data (ie, normal data), the MEC server may perform step S1103.

Specifically, when the data request message includes a data request message for a plurality of data, the MEC server may perform step S1101 for each data request message for a plurality of data.

For example, as in the example of TCU-3 of Table 2, there may be a case in which the data request message includes a data request message for two control data and a data request message for one general data. Then, the MEC server may perform step S1102 for the data request message for two control data, and may perform step S1103 for the data request message for one general data.

Alternatively, the MEC server may determine whether the data requested by the TCU in step S1101 is control data related to safety. For example, the MEC server may perform step S1102 when the data requested by the TCU is control data related to the speed, direction, etc. of the vehicle, such as brake ECU control data, engine ECU control data, steering wheel LIN control data, etc. The MEC server may perform step S1103 when the data requested by the TCU is control data not related to safety, such as roof top LIN control data, video MOST control data, or general data.

In step S1102, the MEC server may determine a transmission beam having the highest data rate as a transmission beam to be used for data transmission.

For example, when the control data is control data related to safety, the MEC server may transmit the control data using a transmission beam having the highest data rate among the available data rates determined in step S905.

When a data request message for a plurality of control data is included in the data request message transmitted by the TCU, a transmission beam having a high data rate may be allocated to each of the plurality of control data in the order of priority of the control data based on a preset safety policy. For example of TCU-3 in Table 2, the priority of brake control data may be higher than that of engine ECU control data. Then, the MEC server may allocate a transmission beam corresponding to the largest data rate (an element of max R(t)) among the elements of R(t) in Table 1 to the break control data, and the MEC server may remove the allocated element from group R(t). Then, the MEC server may allocate a transmission beam corresponding to the next largest data rate among the elements of R(t) to the engine ECU control data, and the MEC server may remove the allocated element from the group R(t).

Alternatively, the MEC server may determine, in step S1102, a transmission beam having the best channel state or the widest coverage among transmission beams having a data rate greater than or equal to the minimum data rate requirement of the control data as a transmission beam to be used for data transmission. For example, the MEC server may allocate a transmission beam, which has a data rate equal to or higher than $S_{3,2}(t)$ among the elements of R(t), with the strongest signal strength or the widest coverage (eg, transmission beam having highest data rate among the transmission beams of the LTE base station) as the transmit beam of brake ECU control data. When a data request message for a plurality of control data is included in the data request message transmitted by the TCU, the MEC server may allocate a transmission beam with best channel state or the widest coverage among the transmission beams having a data rate greater than or equal to the minimum data rate requirement of the control data in the order of priority of the control data for each of a plurality of control data.

In step S1103, the MEC server may determine transmission beam to be used for transmission of data, based on the information on the Ethernet communication speed of the TCU, the information on the minimum data rate of the data requested by the TCU (eg, the minimum data rate requirement) and the available data rate.

Specifically, the MEC server may compare the minimum data rate requirements (e.g. $S_{i,s}(t)$ in Table 2) for general data or control data not related to safety and the Ethernet communication speed of the TCU (e.g. $E_i(t)$). If the minimum data rate requirement is greater than the Ethernet communication speed of the TCU, the MEC server may request that the data rate to be lowered below the Ethernet communication speed of the TCU, when the MEC server requests data from the cloud server associated with the data. For example, if $S_{3,i}(t)$ in Table 2 is greater than $E_3(t)$, the MEC server may request the VR cloud server to lower the data rate of general data related to the VR service to $E_3(t)$ or less.

The MEC server may use $P_{i,s}(t)$ as a result of comparing the minimum data rate requirement of data with the Ethernet communication speed of the TCU, in order to determine a transmission beam to be used for data transmission. Here, it may mean that $P_{i,s}(t)=\min\{S_{i,s}(t), E_i(t)\}$. That is, $P_{i,s}(t)$ becomes $S_{i,s}(t)$ when $S_{i,s}(t)$ is less than or equal to $E_i(t)$, and $P_{i,s}(t)$ becomes $E_i(t)$ when $S_{i,s}(t)$ is bigger than Ei(t).

If there is an element with a data rate greater than or equal to the $P_{i,s}(t)$ value in R(t) in Table 1, the MEC server may select an element with a data rate greater than or equal to the $P_{i,s}(t)$ value, and may select a transmission beam of a base station corresponding to the element as a transmit beam to be used for data transmission. In this case, the MEC server may select an element having the largest data rate among elements having a data rate greater than or equal to the $P_{i,s}(t)$ value. Alternatively, the MEC server may select an element corresponding to a transmission beam having the best channel state or a widest coverage among elements having a data rate equal to or bigger than $P_{i,s}(t)$.

If there is no element having a data rate greater than or equal to the $P_{i,s}(t)$ value in R(t) of Table 1, the MEC server may select a plurality of elements from R(t) and determine the plurality of elements as a transmission beam to be used for data transmission. When the MEC server selects a plurality of elements in R(t), the MEC server may additionally select element one by one in order of the transmit beam of the 5G base station (mmWave), the transmit beam of the 5G base station (sub 6Ghz), the transmit beam of the LTE base station, and the transmit beam of the WiFi base station, in order of the transmission beams having a high data rate. And, whenever the MEC server additionally selects elements from R(t) one by one, the MEC server determines the sum of the data rates of the added elements, and if the sum of the determined data rates is greater than or equal to the $P_{i,s}(t)$ value, the MEC server may determine transmission beam corresponding to each of the added elements to a transmission beam to be used for data transmission. The MEC server determines the sum of the data rates of the added elements, and if the sum of the determined data rates is less than or equal to the $P_{i,s}(t)$ value, until the sum of the determined data rates is being equal to or greater than the $P_{i,s}(t)$ value, the MEC server may add an element one by one from among the transmission beams having high data rate in order of a transmission beam of a base station (mmWave), a transmission beam of a 5G base station (sub 6Ghz), a transmission beam of an LTE base station, and a transmission beam of a WiFi base station.

Table 3 below shows an example in which the MEC server determines the transmission beam by performing step S909.

TABLE 3

| Base station type index (j) | Services and transmit beams assigned to services | delay requirements | Minimum data rate requirements |
|---|---|---|---|
| 1 (5G base station (mmWave)) | $R_{i,1,1}(t)$ | 2 msec | $S_{3,2}(t) = 400$ kbps |
| 2 (5G base station (sub 6 Ghz)) | $R_{i,2,3}(t)$ | 3 msec | $S_{3,3}(t) = 200$ kbps |
| 3 (LTE base station) | VR(s = 1), $R_{i,3,1}(t)$ | 20 msec | $S_{3,1}(t) = 25$ Gbps |
| 4 (WiFi base station) | VR(s = 1), $R_{i,4,2}(t)$ | 20 msec | $S_{3,1}(t) = 25$ Gbps |

Table 3 shows an example of TCU-3 of Table 2 (ie, i=3). Referring to Table 3, for the VR service (s=1) of TCU-3, the MEC server may determine one transmission beam of the LTE base station (transmission beam index=1, data rate=$R_{i,3,1}$ (t)) and one transmission beam (transmission beam index=2, data rate=$R_{i,4,2}(t)$) of the WiFi base station as a transmission beam for transmitting data related to the VR service.

In addition, referring to Table 3, for the brake ECU control data (s=2) of the TCU-3, the MEC server may determine one transmission beam of the 5G base station (mmWave) base station (transmission beam index=1, data rate=$R_{i,1,1}(t)$) as a transmission beam for transmitting brake ECU control data. And, for the engine ECU control data (s=3) of the TCU-3, the MEC server may determine one transmission beam of the 5G base station (sub 6GHz) (transmission beam index=3, data rate=$R_{i,2,3}(t)$) as the transmission beam that transmits engine ECU control data.

The MEC server may perform step S909 until a transmission beam is allocated for all data requested by the TCU through the data request message. That is, the MEC server may perform step S909 until it allocates a transmission beam for all services included in the data request message. That is, the MEC server may perform step S909 for all service indexes s. The MEC server may perform the step S909 in the descending order or in the ascending order of service index s. Alternatively, the MEC server may perform step S909 from the service index related to control data among the service index s, and then may perform step S909 for the service index related to general data. Alternatively, the MEC server performs step S909 from the service index related to control data related to safety from among the service index s, and then performs step S909 on the service index related to control data not related to safety or general data.

When the MEC server receives the data request message from the plurality of TCUs, the MEC server may perform step S909 for all of the plurality of TCUs. The MEC server may perform step S909 for all TCUs in the descending order or in the ascending order of TCU index i. Alternatively, the MEC server may preferentially perform step S909 for the TCU including the data request message for control data in the data request message, and perform step S909 for the remaining TCUs. Alternatively, the MEC server may simultaneously perform step S909 for all of the plurality of TCUs.

Figure 12:
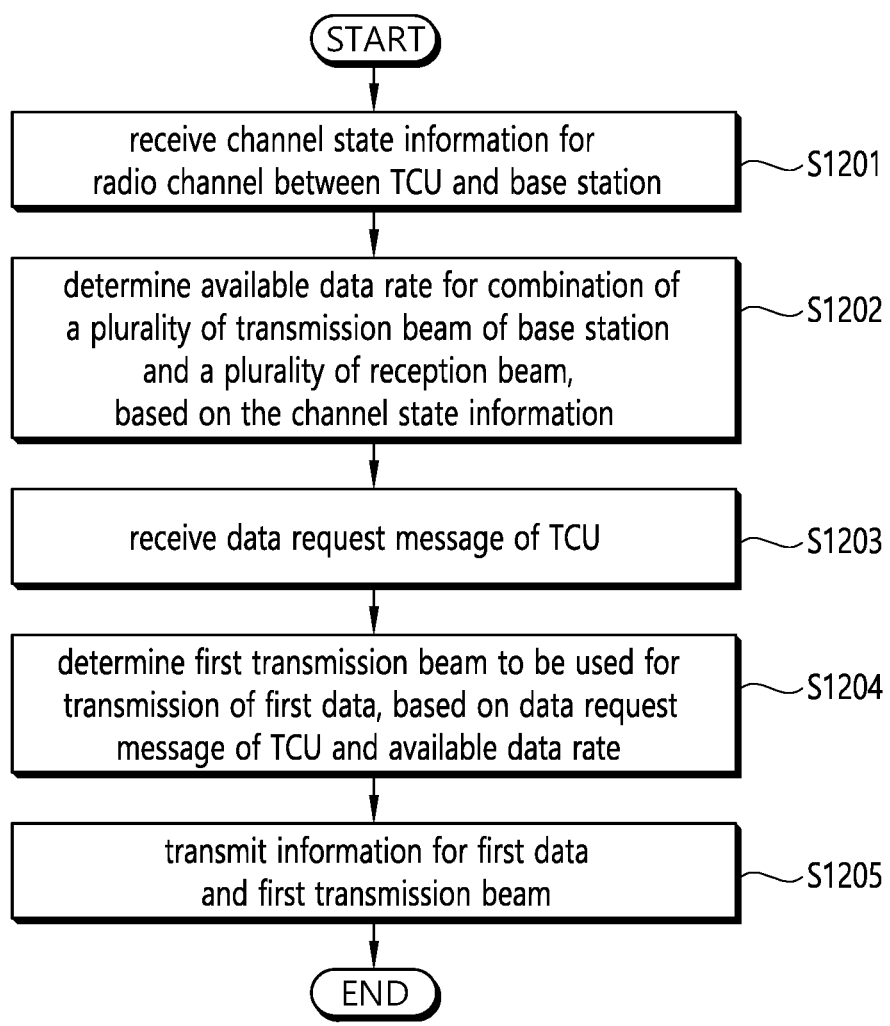
FIG. 12 shows an example of the operation of the MEC server according to the disclosure of the present specification.

FIG. 12 Shows an Example of the Operation of the MEC Server According to the Disclosure of the Present Specification.

The example of FIG. 12 is a diagram briefly explaining the operation of the MEC server described in FIGS. 8 to 11. The MEC server may perform all of the operations described with reference to FIGS. 8 to 11.

Referring to FIG. 12, in step S1201, the MEC server may receive channel state information for a radio channel between the TCU and the base station from a mobile communication network including the base station.

The MEC server may receive information about the TCU connected to the base station from the mobile communication system before performing step S1201. The information on the TCU may include at least one of an ID of the TCU, a service list of the TCU, a delay requirement of the TCU, or a minimum data rate requirement of the TCU.

In step S1202, the MEC server may determine an available data rate for a combination of the plurality of transmit beams of the base station and the plurality of receive beams of the TCU based on the channel state information.

In step S1203, the MEC server may receive the data request message of the TCU from the mobile communication network. The data request message may include information related to the first data requested by the TCU. The data request message may further include information about the Ethernet communication speed of the TCU. The information related to the first data may include information on the type of the first data (eg, information on whether general data or control data, information on which service is associated) and information on a minimum data rate of the first data. The information on the minimum data rate of the first data may include information on the minimum data rate requirement of the first data.

In step S1204, the MEC server may determine a first transmission beam to be used for transmission of the first data based on the data request message of the TCU and the available data rate.

When the type of first data is control data used to control the operation of the vehicle, the MEC server may determine the first transmission beam as a transmission beam corresponding to a data rate having the largest value among available data rates determined among a plurality of transmission beams of the base station. When the first data includes a plurality of control data (eg, when the TCU-3 in Table 2 requests brake control data and engine ECU control data), the MEC server may determine first transmission beam for each of the plurality of control data as a transmission beam corresponding to a data rate of large value in order of higher priority of the plurality of control data.

When the type of the first data is general data, the MEC server may determine the first transmission beam based on the information on the Ethernet communication speed of the TCU, the information on the minimum data rate of the first data, and the determined available data rate.

In step S1205, the MEC server may transmit the first data and information on the first transmission beam to the mobile communication network. The information on the first transmission beam may be used by the base station to transmit the first data to the TCU by using the first transmission beam.

Figure 13:
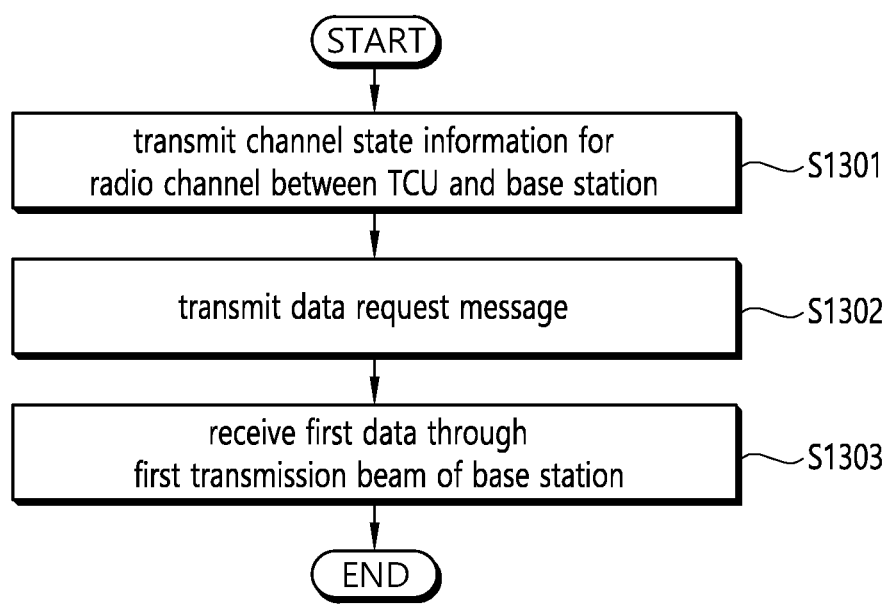
FIG. 13 shows an example of operation of a TCU according to the disclosure of the present specification.

FIG. 13 Shows an Example of Operation of a TCU According to the Disclosure of the Present Specification.

The example of FIG. 13 is a diagram briefly explaining the operation of the TCU described with reference to FIGS. 8 to 11. The TCU may perform all of the operations described with reference to FIGS. 8 to 11.

Referring to FIG. 13, in step S1301, the TCU may transmit channel state information for a radio channel between the TCU and the base station to the base station. The TCU may receive a pilot signal from the base station and determine channel state information based on the received pilot signal. In addition, the TCU may transmit channel state information for a radio channel between the TCU and the base station to the base station.

In step S1302, the TCU may transmit a data request message. The data request message may include information related to the first data. The data request message may include information about the Ethernet communication speed of the TCU. The information related to the first data may include information about a type of the first data and information about a minimum data rate of the first data.

Before performing step S1302, the TCU may receive information related to the first data from at least one device mounted on the vehicle. For example, TCU-3 of Table 2 may receive a message (including service ID, delay requirement, minimum data rate requirement, etc.) requesting general data related to a VR service from a VR device. In addition, the TCU-3 may receive a message requesting brake ECU control data and a message requesting engine ECU control data from the brake ECU and the engine ECU, respectively.

In step S1303, the TCU may receive the first data through the first transmission beam of the base station. Then, the TCU may transmit the first data to the at least one device.

According to the content described in the disclosure of this specification, the MEC server transmits downlink data to the TCU, by utilizing all of the transmission beam of the 5G base station (sub 6Ghz), the transmission beam of the 5G base station (mmWave), the transmission beam of the LTE base station, and the transmission beam of the WiFi base station, such that the transmission speed of downlink data can be improved to 20 Gbps or more. In addition, the 5G base station (mmWave) has a small cell coverage, so handover of the TCU occurs frequently, transmission beam of the 5G base station (sub 6Ghz), the transmission beam of the LTE base station, and the transmission beam of the WiFi base station are utilized, such that seamless service can be provided to users.

According to the disclosure of the present specification, the MEC server may receive information about the service requirements (eg, delay requirements, minimum data rate requirements, etc.) of the service requested by the in-vehicle user from the TCU. The MEC server transmits data by considering the combination of information on service requirements and the transmission beam of the 5G base station (sub 6Ghz), the transmission beam of the 5G base station (mmWave), the transmission beam of the LTE base station, and the transmission beam of the WiFi base station, such that the MEC server can effectively provide high-capacity multimedia services (8K VR, AR, 4K video, 8K video, etc.) of 25 to 30 Gbps requested by in-vehicle users. And, when the TCU is connected to a WiFi base station in an intersection hotspot area in the city, the MEC server can transmit data to the TCU by utilizing all beams of 5G, LTE, and WiFi.

According to the disclosure of the present specification, the MEC server transmits data to the TCU in consideration of the Ethernet communication speed of the TCU, whereby the TCU can effectively provide a multimedia service to the user. In addition, the TCU can provide stable services to users by buffering high-capacity data in advance.

According to the disclosure of the present specification, the MEC server can remotely control the vehicle more safely by allocating a transmission beam in consideration of the type of data requested by the TCU.

Figure 14:
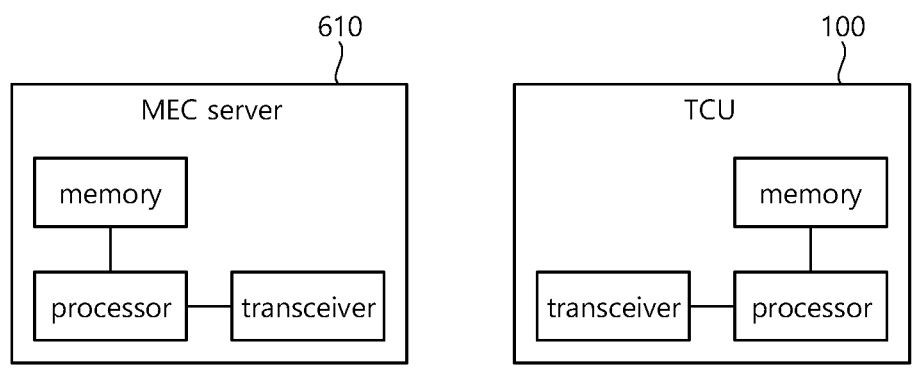
FIG. 14 is a configuration block diagram of an MEC server and a TCU according to an embodiment.

FIG. 14 is a Configuration Block Diagram of an MEC Server and a TCU According to an Embodiment.

Referring to FIG. 14, the MEC server 610 and the TCU 100 may include a memory, a processor, and a transceiver, respectively.

The illustrated processor, memory, and transceiver may each be implemented as separate chips, or at least two or more blocks/functions may be implemented through one chip.

The transceiver includes a transmitter and a receiver. When a specific operation is performed, only one operation of the transmitter and the receiver may be performed, or both the operation of the transmitter and the receiver may be performed. The transceiver may include one or more antennas for transmitting and/or receiving radio signals. In addition, the transceiver may include an amplifier for amplifying a received signal and/or a transmission signal and a bandpass filter for transmitting on a specific frequency band.

As described above, the transceiver of the TCU includes a first 5G transceiver (ie, a modem/antenna using sub 6GHz), a second 5G transceiver (ie, a modem/antenna using mmWave), an LTE transceiver (ie, modem/antenna using LTE).

The processor may implement the functions, processes and/or methods proposed in this specification. The processor may include an encoder and a decoder. For example, the processor may perform an operation according to the above description. Such processors may include application-specific integrated circuits (ASICs), other chipsets, logic circuits, data processing devices, and/or converters that convert between baseband signals and radio signals.

Memory may include read-only memory (ROM), random access memory (RAM), flash memory, memory cards, storage media, and/or other storage devices.

Figure 15:
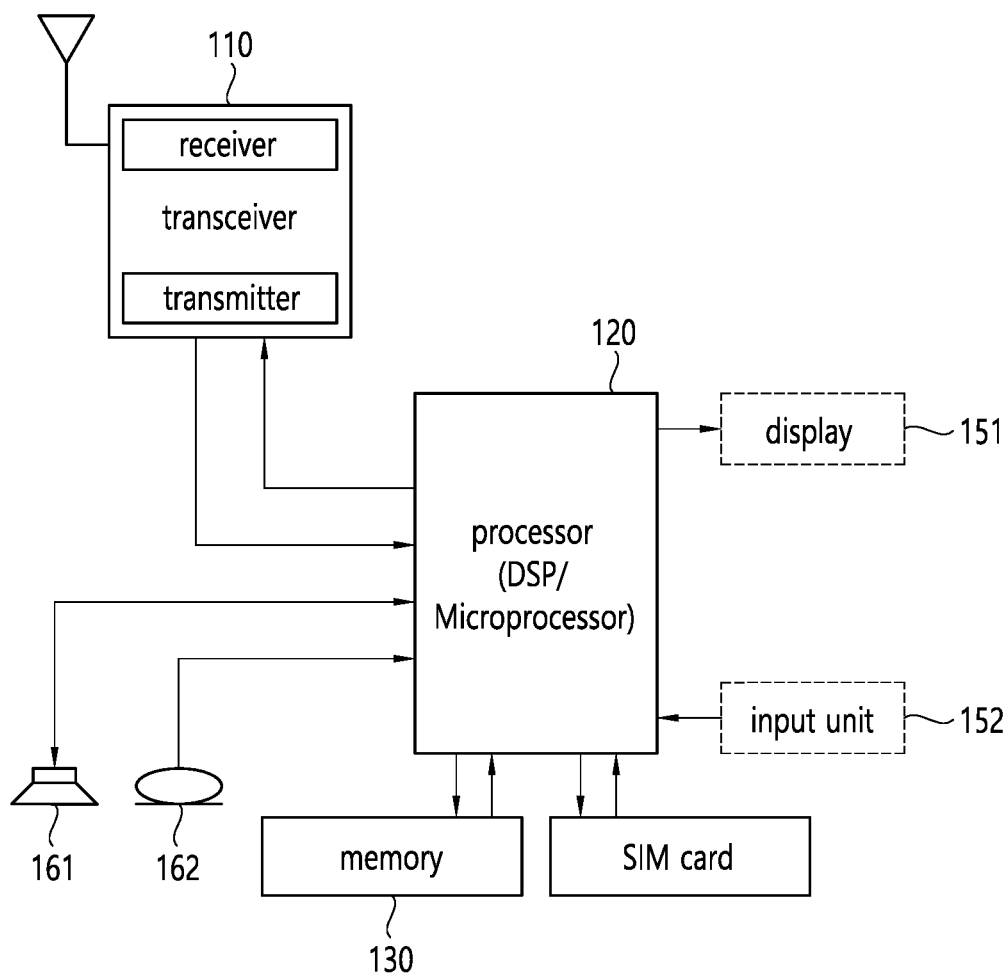
FIG. 15 is a block diagram illustrating in detail the configuration of a TCU according to an embodiment of the present disclosure.

FIG. 15 is a Block Diagram Illustrating in Detail the Configuration of a TCU According to an Embodiment of the Present Disclosure.

The illustrated TCU 100 includes a transceiver 110, a processor 120, a memory 130, one or more antennas, and a subscriber identification module (SIM) card.

The illustrated TCU 100 may further include a speaker 161 and a microphone 162 as necessary.

The illustrated TCU 100 may further include a display 151 and an input unit 152 as necessary.

The processor 120 may be configured to implement the proposed functions, procedures and/or methods described herein. The layers of the radio interface protocol may be implemented in the processor 120. The processor 120 may include an application-specific integrated circuit (ASIC), other chipsets, logic circuits, and/or data processing devices. The processor 102 may be an application processor (AP). The processor 120 may include at least one of a digital signal processor (DSP), a central processing unit (CPU), a graphics processing unit (GPU), and a modem (modulator and demodulator). Examples of processor 120 may be SNAPDRAGON™ series processors manufactured by Qualcomm®, EXYNOS™ series processors manufactured by Samsung®, A series processors manufactured by Apple®, HELIO™ series processors manufactured by MediaTek®, INTEL® It may be an ATOM™ series processor manufactured by the company or a corresponding next-generation processor.

The display 151 outputs the result processed by the processor 120. Input unit 152 receives input to be used by processor 120. The input unit 152 may be displayed on the display 151. A SIM card is an integrated circuit used to securely store an international mobile subscriber identity (IMSI) and its associated keys used to identify and authenticate subscribers in mobile phone devices such as mobile phones and computers. The SIM card may not be physically implemented, but may be implemented as a computer program and stored in the memory.

The memory 130 is operatively coupled to the processor 120 and stores various information for operating the processor 120. Memory 130 may include read-only memory (ROM), random access memory (RAM), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory 130 and executed by processor 120. The memory 130 may be implemented inside the processor 120. Alternatively, the memory 130 may be implemented outside the processor 120, and may be communicatively connected to the processor 120 through various means known in the art.

The transceiver 110 is operatively coupled to the processor 120 and transmits and/or receives a radio signal. The transceiver 110 includes a transmitter and a receiver. The transceiver 110 may include a baseband circuit for processing a radio frequency signal. The transceiver controls one or more antennas to transmit and/or receive radio signals.

The speaker 161 outputs sound related results processed by the processor 120. Microphone 162 receives sound related input to be used by processor 120.

In the above, preferred embodiments of the present disclosure have been exemplarily described, but the scope of the present disclosure is not limited only to such specific embodiments, and thus the present disclosure may be modified, changed, or improved in various forms within the spirit of the present disclosure and the scope described in the claims.

In the exemplary system described above, the methods are described on the basis of a flowchart as a series of steps or blocks, but the present disclosure is not limited to the order of steps, and some steps may occur in a different order or concurrently with other steps as described above. In addition, those skilled in the art will understand that the steps shown in the flowchart are not exhaustive and that other steps may be included or that one or more steps in the flowchart may be deleted without affecting the scope of the present disclosure.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A server for controlling a Telematics Communication Unit (TCU) mounted on a vehicle in a next-generation mobile communication system, comprising:
   a transceiver; and
   a processor for controlling the transceiver,
   wherein the processor is configured to perform:
   controlling the transceiver to receive channel state information for a radio channel between the TCU and a base station from a mobile communication network including the base station;
   determining a data rate available for a combination of a plurality of transmit beams of the base station and a plurality of receive beams of the TCU based on the channel state information;
   controlling the transceiver to receive a data request message of the TCU from the mobile communication network,
   wherein the data request message includes information related to first data requested by the TCU;
   determining a first transmission beam to be used for transmission of the first data based on the data request message of the TCU and the determined available data rate; and
   controlling the transceiver to transmit the first data and information on the first transmission beam to the mobile communication network,
   wherein the data request message further includes information related to Ethernet communication speed of the TCU.

2. The server of claim 1,
   wherein the information related to the first data includes information related to a type of the first data and information related to a minimum data rate of the first data.

3. The server of claim 2,
   when the type of the first data is control data used to control an operation of the vehicle, the first transmission beam is determined as a transmission beam corresponding to a data rate having the largest value among the determined available data rates among a plurality of transmission beams of the base station.

4. The server of claim 3,
   when the first data includes a plurality of control data, a first transmission beam for each of the plurality of control data is determined as a transmission beam corresponding to a data rate of a larger value in an order of priority of the plurality of control data.

5. The server of claim 2,
   when the type of the first data is data other than control data, the first transmission beam is determined based on the information related to the Ethernet communication speed of the TCU, the information related to minimum data rate of the first data, and the determined available data rate.

6. The server of claim 1,
   wherein the processor is further configured to perform:
   receiving information related to the TCU connected to the base station from the mobile communication system,
   wherein the information related to the TCU includes at least one of an Identity (ID) of the TCU, a service list of the TCU, a delay requirement of the TCU, or a minimum data rate requirement of the TCU.

7. The server of claim 1,
   wherein the information related to the first transmission beam is used to transmit the first data to the TCU using the first transmission beam of the base station.

8. A Telematics Communication Unit (TCU) mounted on a vehicle, comprising:
   a transceiver;
   a memory; and
   a processor for controlling the transceiver and the memory, the processor is configured to perform:
   controlling the transceiver to transmit channel state information related to a radio channel between the base station and the TCU to a base station;
   controlling the transceiver to transmit a data request message to the base station;
   wherein the data request message includes information related to first data requested by at least one device mounted on the vehicle; and
   controlling the transceiver to receive the first data from the base station through the first transmission beam of the base station, wherein the data request message includes information related to the Ethernet communication speed of the TCU.

9. The TCU of claim 8, wherein the information related to the first data includes information related to a type of the first data and information on a minimum data rate of the first data.

10. The TCU of claim 8, wherein the processor is further configured to perform:
receiving information related to the first data from the at least one device.

11. The method of claim 10, wherein the processor is further configured to perform:
transmitting the received first data to the at least one device.

* * * * *